(12) United States Patent
Norris, III

(10) Patent No.: US 10,572,149 B2
(45) Date of Patent: Feb. 25, 2020

(54) PARTIAL WORD COMPLETION VIRTUAL KEYBOARD TYPING METHOD AND APPARATUS, WITH REDUCED KEY SETS, IN ERGONOMIC, CONDENSED STANDARD LAYOUTS AND THUMB TYPING FORMATS

(71) Applicant: Forbes Holten Norris, III, Princeton, NJ (US)

(72) Inventor: Forbes Holten Norris, III, Princeton, NJ (US)

(*) Notice: Subject to any disclaimer, the term of this patent is extended or adjusted under 35 U.S.C. 154(b) by 419 days.

(21) Appl. No.: 15/302,966

(22) PCT Filed: Apr. 8, 2015

(86) PCT No.: PCT/US2015/025012
§ 371 (c)(1),
(2) Date: Oct. 7, 2016

(87) PCT Pub. No.: WO2015/157474
PCT Pub. Date: Oct. 15, 2015

(65) Prior Publication Data
US 2017/0052702 A1 Feb. 23, 2017

Related U.S. Application Data

(63) Continuation of application No. PCT/US2014/033235, filed on Apr. 8, 2014.

(51) Int. Cl.
*G06F 3/0488* (2013.01)
*G06F 3/0482* (2013.01)
*G06F 17/27* (2006.01)

(52) U.S. Cl.
CPC ........ *G06F 3/04886* (2013.01); *G06F 3/0482* (2013.01); *G06F 3/04883* (2013.01); *G06F 17/276* (2013.01)

(58) Field of Classification Search
CPC .................................................... G06F 3/04886
See application file for complete search history.

(56) References Cited

U.S. PATENT DOCUMENTS 5,835,635 A  11/1998  Nozaki
7,177,797 B1  2/2007  Micher
(Continued)

*Primary Examiner* — Jennifer N To
*Assistant Examiner* — Ashley M Fortino
(74) *Attorney, Agent, or Firm* — Graham Casanova Alig; Alig Patent Law

(57) ABSTRACT

Text entry with short, incremental, partial word completions improves virtual keyboard efficiency; ergonomics are improved by far fewer, but far larger, more relevant keys, in highly condensed layouts, retaining familiar structural patterns of standard keyboards like QWERTY, and utilizing curved thumb typing formats. The keyboard continuously adjusts numbers of keys, key sizes, predictive values and layouts, to minimize keystrokes and reduce errors, while providing the most ergonomic, minimalist interface possible at any moment, scaling to any size device. Keys display normal default characters but concatenated with supplemental predictive values, each representing the longest common building block shortcut of likely intended words derivable from a key's default value. The most relevant keys can generate larger numbers of highly predicted words; the more relevant, the larger the key; these longer more precise values provide look ahead spelling guidance, reducing misspellings.

12 Claims, 35 Drawing Sheets

(56) References Cited

U.S. PATENT DOCUMENTS

| | | | |
|---|---|---|---|
| 7,372,454 B2* | 5/2008 | Betts-LaCroix | H01H 13/84 345/168 |
| 7,886,233 B2 | 2/2011 | Rainisto et al. | |
| 8,185,841 B2 | 5/2012 | Rainisto | |
| 8,719,724 B2 | 5/2014 | Kawalkar | |
| 9,122,672 B2 | 9/2015 | Griffin et al. | |
| 2006/0085757 A1* | 4/2006 | Andre | G06F 3/041 715/771 |
| 2007/0009303 A1* | 1/2007 | Kurriss | G06F 3/0238 400/486 |
| 2007/0046641 A1 | 3/2007 | Lim | |
| 2009/0193334 A1 | 7/2009 | Assadollahi | |
| 2010/0225599 A1 | 9/2010 | Danielsson et al. | |
| 2012/0036469 A1 | 2/2012 | Suraqui | |
| 2012/0324391 A1* | 12/2012 | Tocci | G06F 3/048 715/773 |
| 2013/0002553 A1 | 1/2013 | Colley | |
| 2013/0120266 A1 | 5/2013 | Griffin et al. | |
| 2013/0205242 A1 | 8/2013 | Colby | |
| 2014/0043325 A1* | 2/2014 | Ruble | G06T 15/10 345/419 |
| 2015/0082229 A1 | 3/2015 | Ouyang et al. | |
| 2015/0089435 A1 | 3/2015 | Kuzmin | |
| 2017/0139559 A1 | 5/2017 | Colby | |
| 2017/0199665 A1 | 7/2017 | Zhai et al. | |
| 2017/0206193 A1 | 7/2017 | Bi et al. | |

* cited by examiner

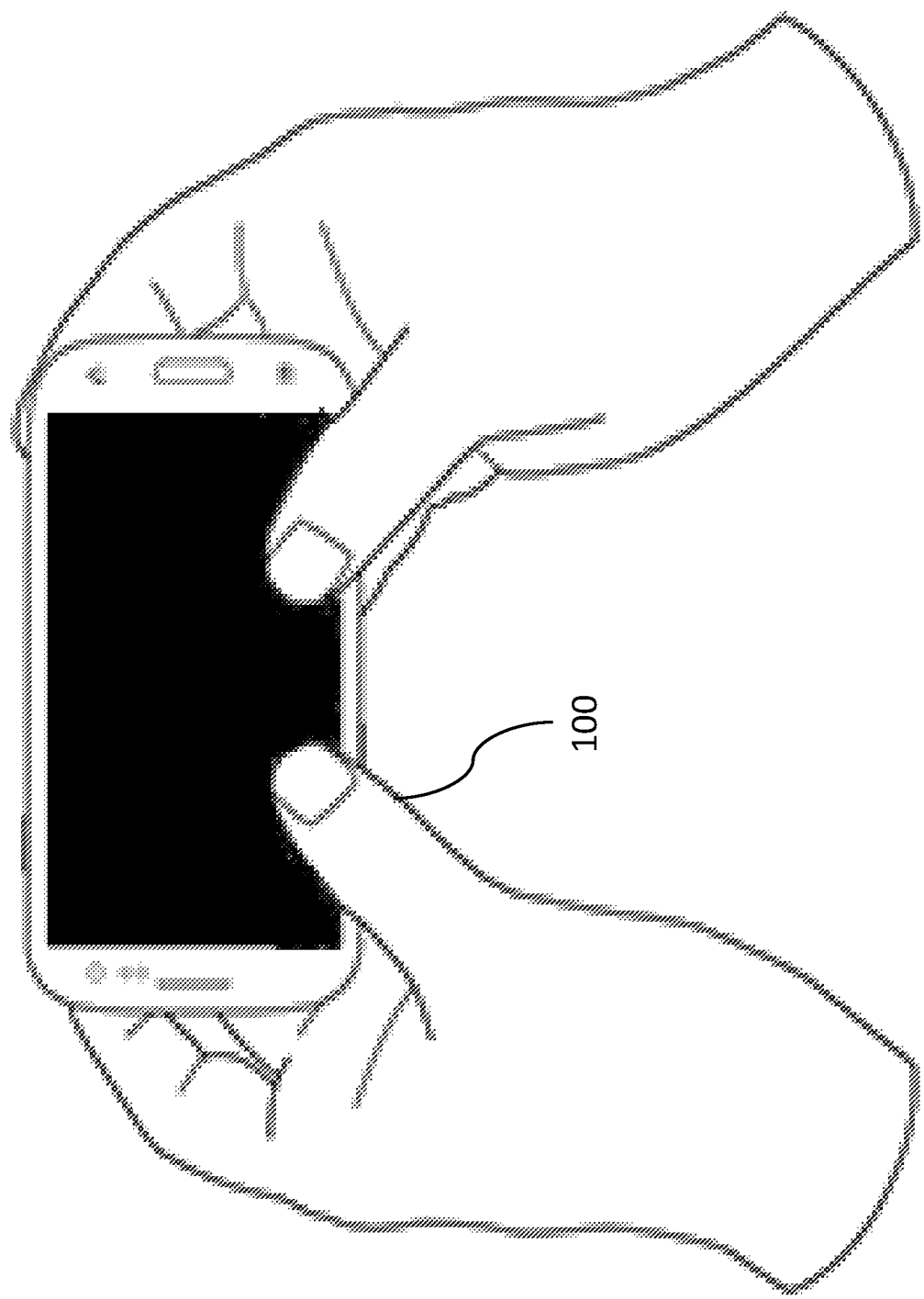

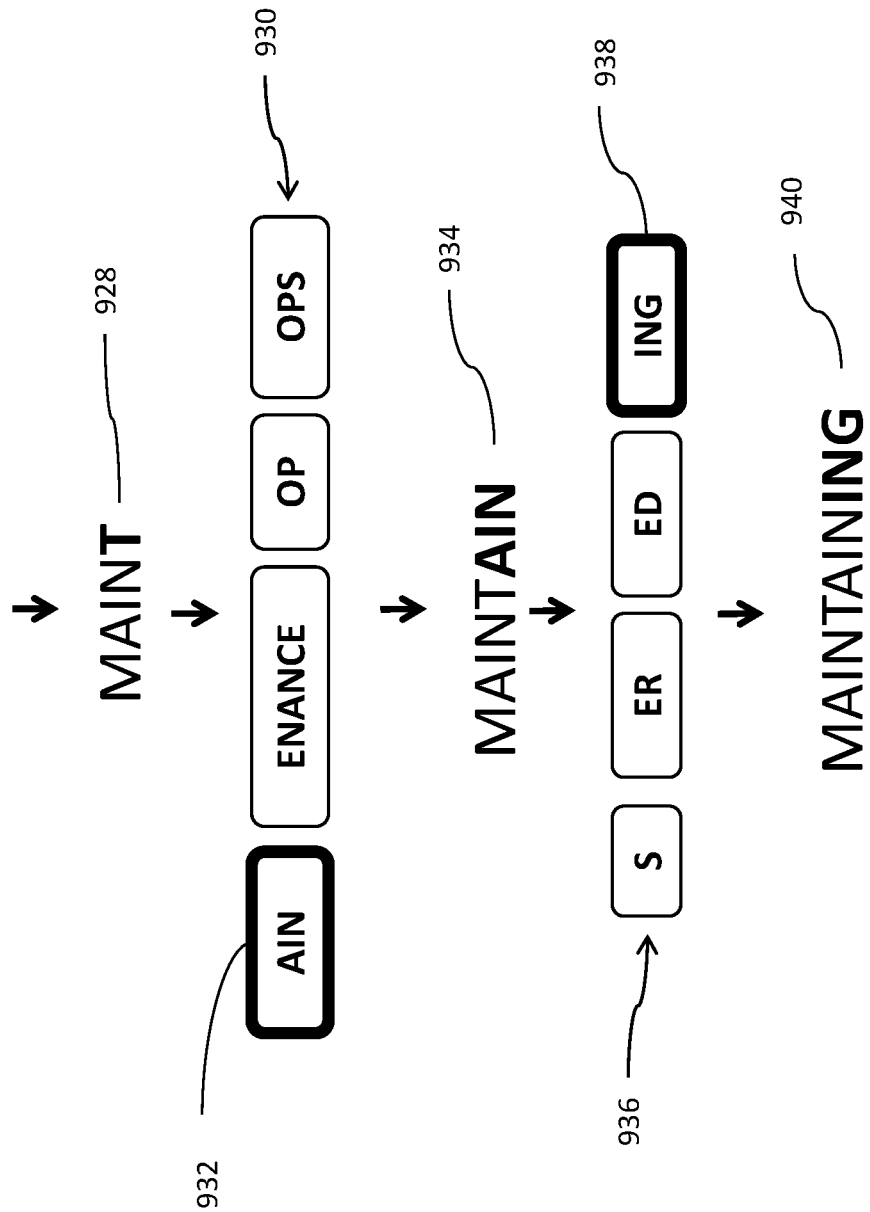

PARTIAL WORD COMPLETION VIRTUAL KEYBOARD TYPING METHOD AND APPARATUS, WITH REDUCED KEY SETS, IN ERGONOMIC, CONDENSED STANDARD LAYOUTS AND THUMB TYPING FORMATS

CROSS REFERENCE TO RELATED APPLICATIONS

This application claims priority to PCT/US2014/33235 filed Apr. 8, 2014, the entire contents of which are incorporated herein by reference.

TECHNICAL FIELD

This invention pertains to the entry of text on computer screens having a virtual keyboard and limited screen space, for example as would be found on a mobile handheld computer, tablet, smartphone, automobile dashboard, smart watch, home based smart appliances (like a thermostat control), industrial equipment controls, virtual reality display screens (projector eyewear, headgear, helmets, glasses/goggles such as Google Glass, military heads up displays, game consoles like the Nintendo Wii, Microsoft Kinect, etc.). The invention pertains to general keyboard layouts, touch screen virtual keyboards and text editing word completion suggestion menus.

BACKGROUND OF THE INVENTION

On small screen virtual keyboards normally tiny keys are hard to see and accurately select, make typing slow, tedious, difficult, and highly error prone. Tedious and inaccurate text entry can also be a significant problem even on larger devices such as tablet computers when typing on a virtual keyboard.

Virtual keyboards typical of touch screen mobile devices are also challenging to use because they generally duplicate the design of larger physical desktop keyboards, not taking into account the different ergonomics of small screen virtual keyboards, particularly common hand held usage. The mobile devices of interest in this invention are typically smartphone-type handheld computers, such as the Apple iPhone devices, Android devices, or similar sized devices that are typically about 60-70 mm wide and 100-140 mm long, typically small enough to fit in a pant, shirt or jacket pocket. but other larger or smaller devices can also be used with this invention. For example wrist worn devices or tablet computers. These handheld computers can be used to prepare and send SMS text messages, emails, and edit word processing documents. There are many other applications on such handheld computers that require text input, for example entering web addresses, and usernames and passwords. The aforementioned handheld computers typically display a virtual keyboard when text entry is required, usually splitting the screen between an upper portion displaying content, and a lower portion displaying a virtual keyboard.

In common usage, one or both hands are typically used to cradle and hold the mobile device, and the user taps the keyboard with their thumbs, resulting in "thumb typing" on keyboards designed for 10 fingers. Virtual keyboards optimized for thumb typing has been described previously, for example in European patent publication EP2194437, and US patent publication US2013/0057475.

Various ergonomic improvements disclosed in the prior art involve variable keyboard positioning, such as centering on the device, and split keyboards, designed to move keys closer to fingers, particularly the thumbs, at the edges of the device. The Apple IPad variable keyboard is a commercial example of these two approaches.

But even with such improvements, typing on virtual keyboards remains more awkward and difficult than necessary, often because the keyboard layout remains the static QWERTY standard of physical keyboards. There have been many efforts to improve on the QWERTY layout, for example the Dvorak design which re-positions keys based on letter frequency; however few if any address the specific needs of the virtual screen mobile typing. Furthermore, many Dvorak-like designs are so different from the QUERTY standard that adoption is fairly limited, as users prefer to stick with just one standardized, if less than optimal, keyboard layout.

Virtual keyboards are a text input user interfaces employed on computer screens in which the computer renders an image of a keyboard, and the user selects "keys" directly from key images, where a "key" is nothing more than a selectable screen region. Virtual keyboards generally lack physical keys and rely on touch screens in which direct user finger or stylus touch selects keys. Other types of virtual keyboards can involve myriad selection methods, such as pointer devices like mice, hand gesture movement sensors, eye movement tracking, even direct nerve impulses or thoughts using biosensors.

Some inventions optimize the ergonomics of thumb typing by customizing keyboard dimensions and layouts to individual thumb and hand sizes. An example is seen in US 20130057475 A1, "Split keyboard for thumb typing".

Another common approach improves thumb typing ergonomics with keyboard layouts that conform more closely to the easiest thumb movements, generally involving an arcing motion with thumbs loosely extended and tip unbent. Examples can be seen at www.blog.42at.com/thumb-keyboard-concept-for-the-ipad. However, such designs tend to significantly after common and popular desktop designs, requiring learning entirely new layouts, with steep learning curves, a big drawback for many users.

Another approach to making small virtual keyboards easier to use is word completion menus. One such method is disclosed in U.S. Pat. No. 7,886,233, (the 233 patent) involving text typing triggered menus which try guess the completed endings of words being entered.

Another approach is to make the most important keys larger in size and more visible, seen in software products like ThickButtons (www.thickbuttons.com) supported by provisional U.S. Pat. No. 8,413,066, US20100115448.

"Sloppy" typing is a common and effective enhancement method which permits imprecise but automatically corrected typing, using predictive analysis to figure out which letter was actually intended.

However even the most effective enhancement approaches have significant limitations on the smallest screens, since most adhere to conventional keyboard paradigms, such as always displaying the entire set of static, single letter keys. This results in too many keys in too small a space, making them very challenging to see and accurately select. For example, sloppy typing slows down greatly the more keys the user simultaneously touches. And visualization problems become even more challenging for the visually impaired and older people.

Conventional word completion menus also become challenging to use efficiently on the smallest screens because of inadequate space to display and easily see multiple full length word suggestions.

A different approach is shown in co-pending patent applications PCT/US2014/31121 and US2014/776,742 titled "Space Optimizing Micro Keyboard Method and Apparatus", which discloses limited menu key sets based on prioritized letters and small incremental word completion fragments, allowing fewer, but larger than normal, variable key sizes, improving usability on very small screens. This approach effectively transforms the keyboard into a partial word completion menu system, while also retaining standard, layouts like QWERTY, particularly the familiar patterns of the relative positions of letters and keys; this allows the user to quickly find keys in the same locations as their normal desktop keyboard.

However, none of these advanced word completion approaches specifically addresses ergonomic thumb typing optimization needs.

What's needed are better virtual keyboard layouts specifically addressing the common ergonomic usage patterns of virtual keyboard thumb typing, particularly on very small screens.

SUMMARY OF THE INVENTION

To address the shortcomings of thumb typing, this invention discloses methods and apparatus that optimize thumb typing on virtual keyboards, particularly on space-constrained small handheld devices, such as smartphones and "wearables" such as smartwatches, or other small devices worn on the body, or small screens which control appliances, for example a thermostat control. The methods and apparatus disclosed herein may also be useful on larger devices such as tablet computers.

In an embodiment, this invention provides a method of presenting keys to a user for text entry on a virtual keyboard with a standard keyboard layout on a touch sensitive computer screen for ergonomically optimal thumb typing, the method comprising placing a set of one or more contextually relevant menu keys at ergonomically preferred positions on the computer screen, where the natural arc of the tip of one or both thumbs abducting or adducting, where one or both thumbs is loosely bent at the interphalangeal joint knuckle, which defines the most ergonomically preferred positions on the computer screen, wherein the contextually relevant menu keys overlay the standard keyboard.

In an embodiment, the contextually relevant menu keys are dynamically generated by an algorithm that determines the next viable word completion fragments for any word or set of letters entered by the user prior to the generation of the contextually relevant menu keys.

The method transforms normal keyboards into highly dynamic menu systems where keyboard layouts and key labels are highly flexible and can change and adapt to provide users the largest possible keys on a keystroke by keystroke basis. A limited set of keys is generated dynamically to generate keys optimizing the space, size, and visibility of each key.

The invention also discloses methods and apparatus that modify virtual keyboard layouts, keyboard menu systems, for faster, easier, more accurate typing, particularly optimized for thumb typing.

BRIEF DESCRIPTION OF THE DRAWINGS

FIG. 1C shows typical double thumb typing mobile device hand positions.

DETAILED DESCRIPTION

This invention addresses solutions for these aforementioned issues pertaining to virtual keyboards.

A "user" in this context is a person who is using a computer with a virtual keyboard. As used herein, "text" means letters, numbers, standard keyboard symbols or other user selectable symbols that are entered at a computer keyboard, for any text entry operation that is typically necessary in the use of a computer, such as writing, creating emails and SMS text message, entering passwords, or entering user authentication data such as usernames and passwords. The term "standard layout" generally refers to a QWERTY keyboard, which is the typical keyboard in use worldwide at this time. Alternative keyboards have been developed, for example the Dvorak keyboard, which also have a standardized layout.

Figure 1A:
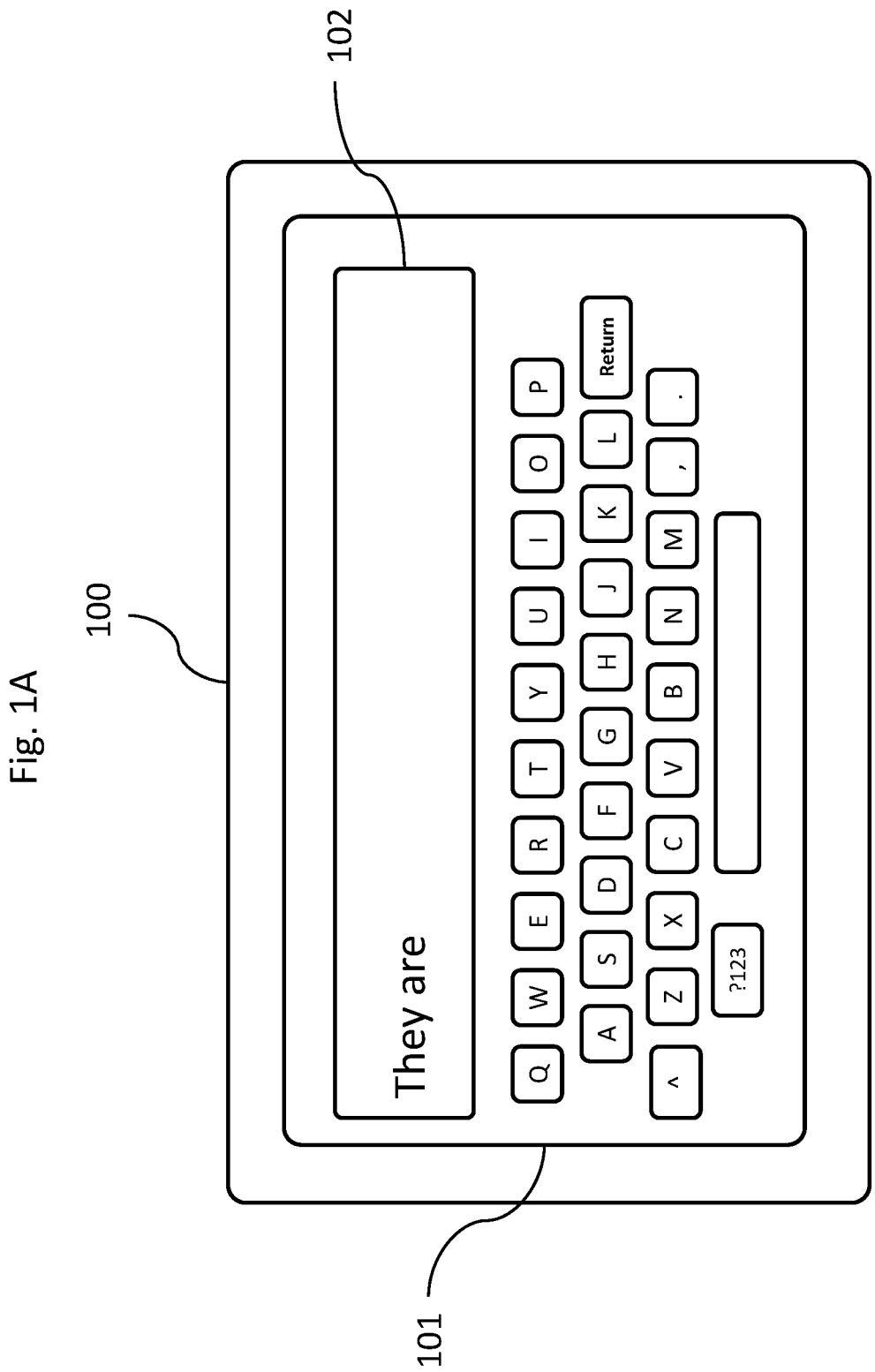
FIG. 1A shows a typical small computer device virtual screen keyboard editing apparatus and typical thumb typing finger positions.

FIG. 1A shows a typical mobile computer device 100, with virtual display 101, with edit display area 102 and typical QWERTY keyboard layout.

Optimal Thumb Typing

Thumb typing in this context assumes one or both hands cradle a handheld computer device, and the thumbs of the cradling hand or hands are the primary though not necessarily the exclusive means for operation of the virtual screen keyboard and controls. Devices in this context are generally smartphones or tablet type computers that normally have a touch screen where a virtual keyboard can be displayed.

When cradled by both hands, the device is generally supported from behind by some combination of the palms and the four non-thumb fingers (index, middle, ring and small/pinky), or a subset of such fingers, normally leaving the thumbs free in the front of the device virtual screen.

Figure 1B:
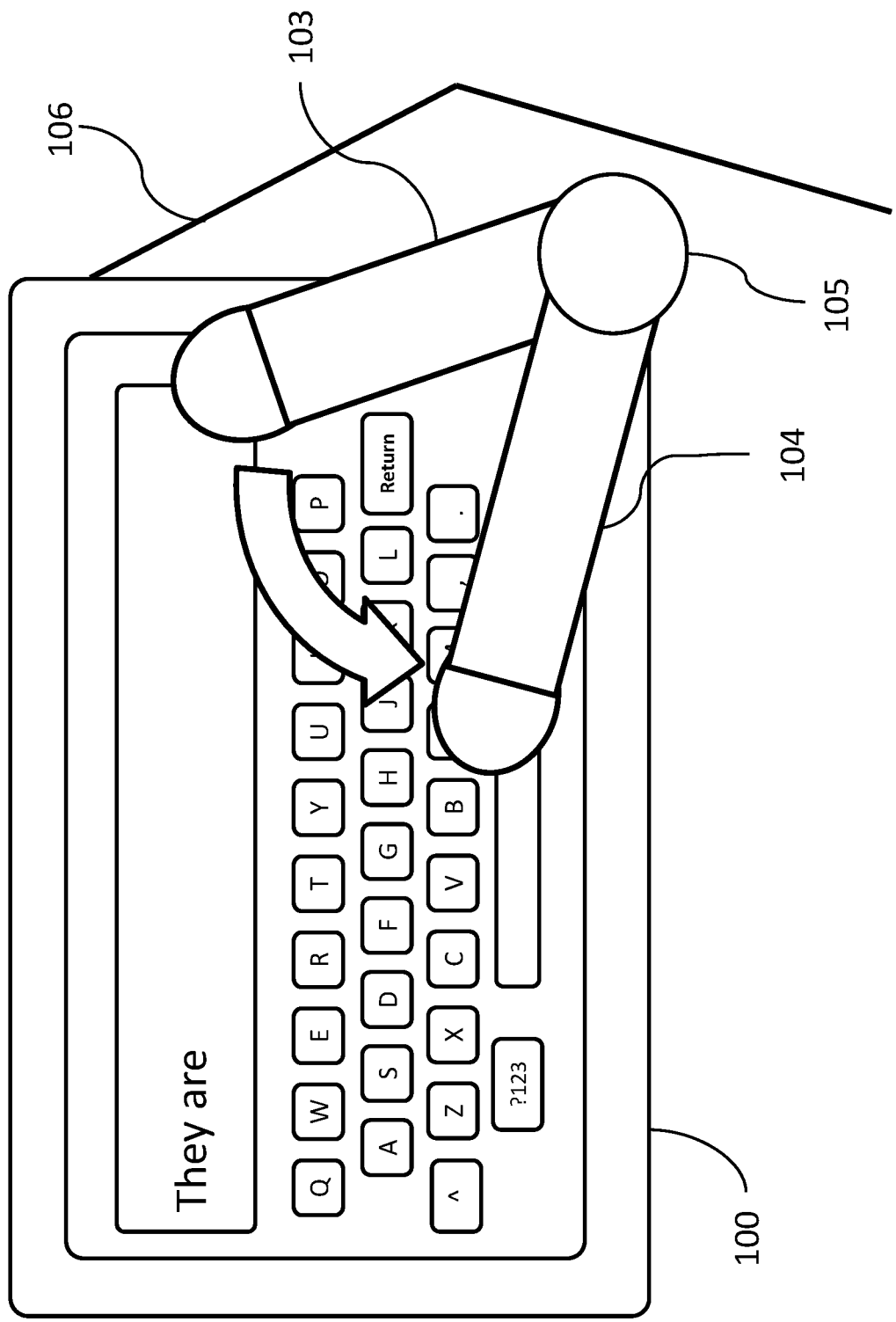
FIG. 1B shows the pivot motion of a single thumb typing arc.

There are myriad possible variations of such cradling finger positions, but typically in dual hand mode, one or both index fingers are at least partially located near or contacting the sides of the device, and frequently pinky or other fingers may also support the device, via contact with a different opposing side of the device. This is depicted in FIG. 1B.

Single hand cradling can also involve myriad non-thumb finger and palm cradling variations.

Thumb typing can be difficult and awkward when the thumb has to frequently bend at the second knuckle in towards the palm. This is particularly an issue for those with painful or stiff fingers, for example due to medical conditions like arthritis, but even for persons without a medical condition, bending of the thumb can be uncomfortable for more than very brief periods and lead to challenging and inaccurate text entry on a virtual keyboard.

Rapid, efficient, comfortable thumb typing movements are generally easiest when the thumb moves in an arcing motion, fully extended with the thumb tip loosely bent or held relaxed, very minimally bent at the second or minor mid-finger distal interphalangeal (DIP) joint knuckle.

As used herein, the terms "relaxed" or "loosely unbent" thumbs refers to a comfortable position of the thumb interphalangeal joint knuckle that is slightly bent, by about 100 to about 300, The inward motion at this joint is called "flexion" where the thumb tip is bent inward at the interphalangeal joint, and "extension" when the thumb tip is bent outward at the interphalangeal joint. The arc (the "arc") of the thumb tips is defined by an abducting or adducting motion, in which abduction is the thumb tip moving away from the forefinger in the plane of the palm, and adduction is the thumb tip moving toward the forefinger in the plan of the palm. This is also termed "Radial Adduction/Abduction." These terms are further defined and well-illustrated on the website of the American Society for Surgery of the Hand, at www.assh.org/Public/HandAnatomy/Pages/default.aspx. The ergonomic sweet spot for thumb typing is at the arc defined by this sweeping, pivoting (abducting or adducting) motion of the thumb, between a thumb near and far position relative to the forefinger.

The sweet spot is shown schematically in FIG. 1B, depicting a typical right hand thumb typing near position (103) and far position (104), where the arrow indicates the thumb arc motion between the two positions pivoting from the thumb's pivot point (105). Item 106 shows a common index finger rear support position the at edge of the device, though other or multiple fingers could be used in such a position.

The exact location and shape of these arcs varies depending upon factors like the user's hand dimensions, cradling techniques, and the dimensions of the device, virtual screen and virtual keyboard.

Arc curvatures can vary from relatively flat semi-oval to more symmetrical and circular in shape.

In an embodiment, the device may automatically determine the position of the thumbs relative to the virtual keyboard at any given moment, by sensing the user's hand dimensions, current hand and finger positions, device orientation (for example portrait or landscape), current cradling technique and past text editing history.

Thumb positions are used to calculate optimal arc shapes and locations, which are then used to determine the easiest, most efficient key layout in any given thumb typing circumstance.

Quarter Circle (QC) ARCS

The side quarter circle arc ("qc arc") is one of the most common thumb motion arc patterns, resembling a quarter circle going from the keyboard top sides (the near position) to the keyboard bottom center (the far position), where the arc curvature can also be semi-oval in shape.

Qc arcs typically involve index finger(s) located at the sides of the device near the sides of the virtual keyboard, 106 in FIG. 1B. The thumb near position usually places the thumbs tips near the keyboard top side areas close to the edges of the device; for example in a QWERTY layout, directly above or adjacent either the Q or the P keys.

In this scenario the thumb far position typically places the thumb tips near the bottom center of keyboard, adjacent to the bottom space bar and the QWERTY layout V, B, N keys.

Figure 2A:
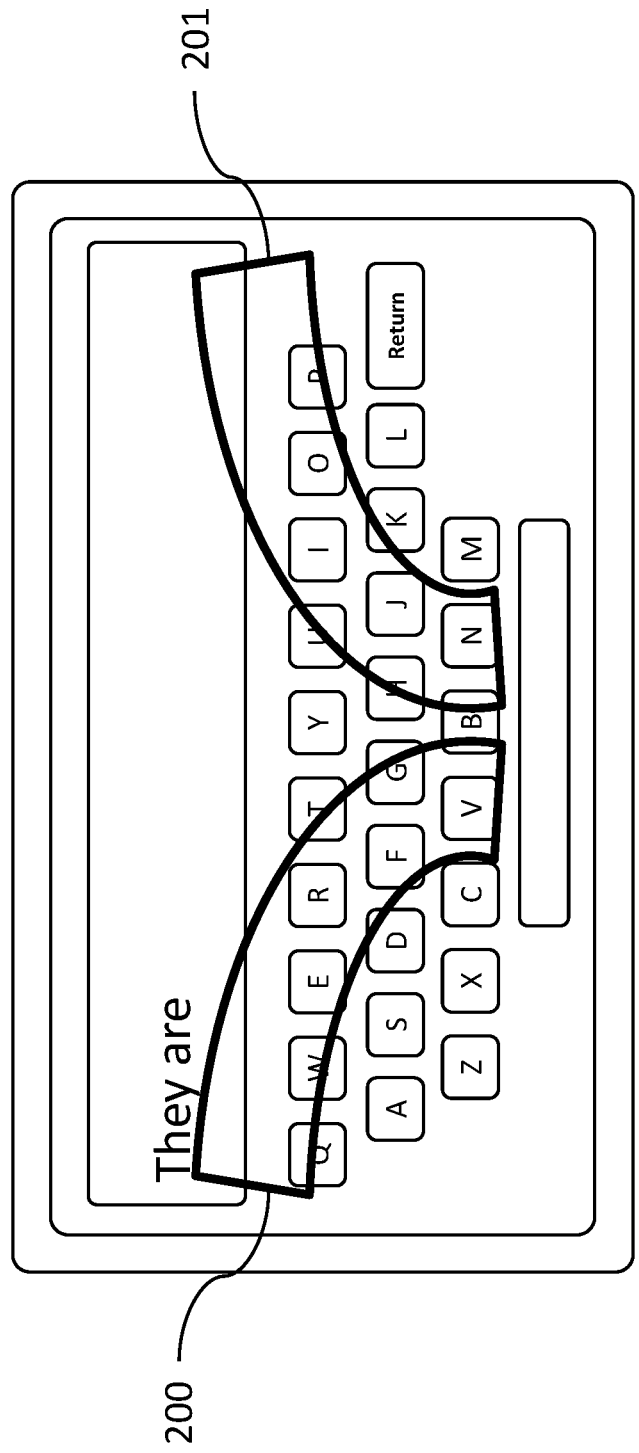
FIG. 2A shows a typical double thumb optimal arc movement pattern.

Dual qc arcs at both sides of the keyboard is one of the most common two handed thumb typing patterns, and is particularly well suited for split keyboards common on some mobile devices. FIG. 2A shows a typical dual thumb qc arc pattern overlaying a standard QWERTY keyboard, with left hand thumb arc 200 and right hand thumb arc 201.

Figure 2B:
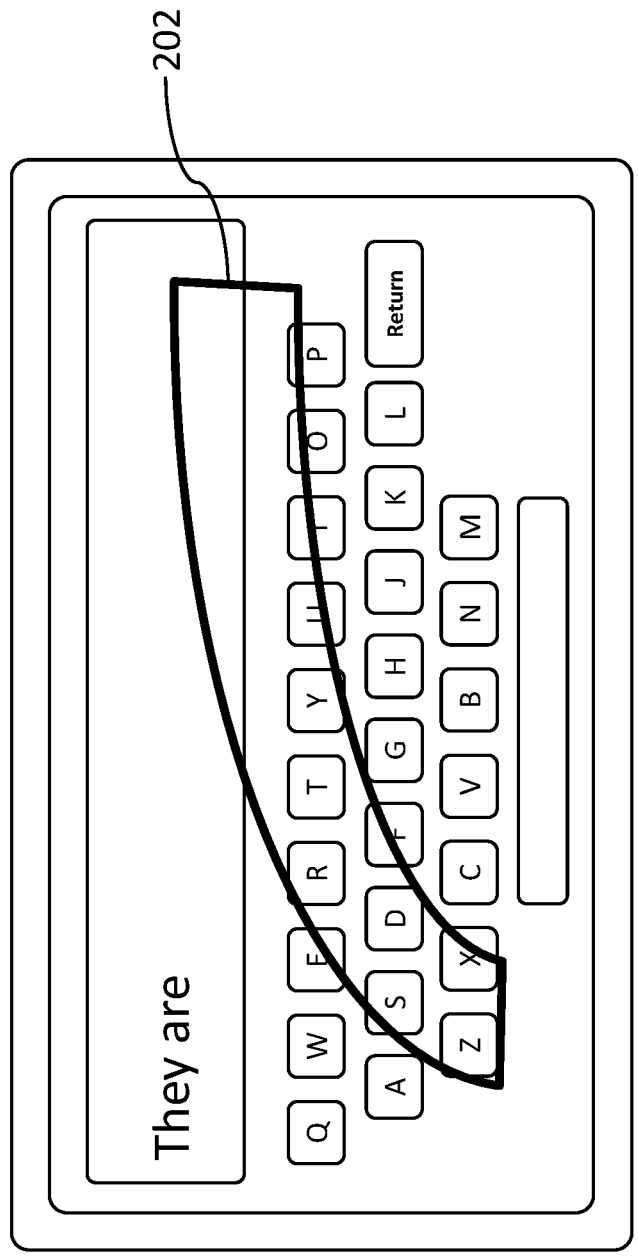
FIG. 2B shows a typical right hand only optimal thumb typing arc movement pattern.
Figure 2C:
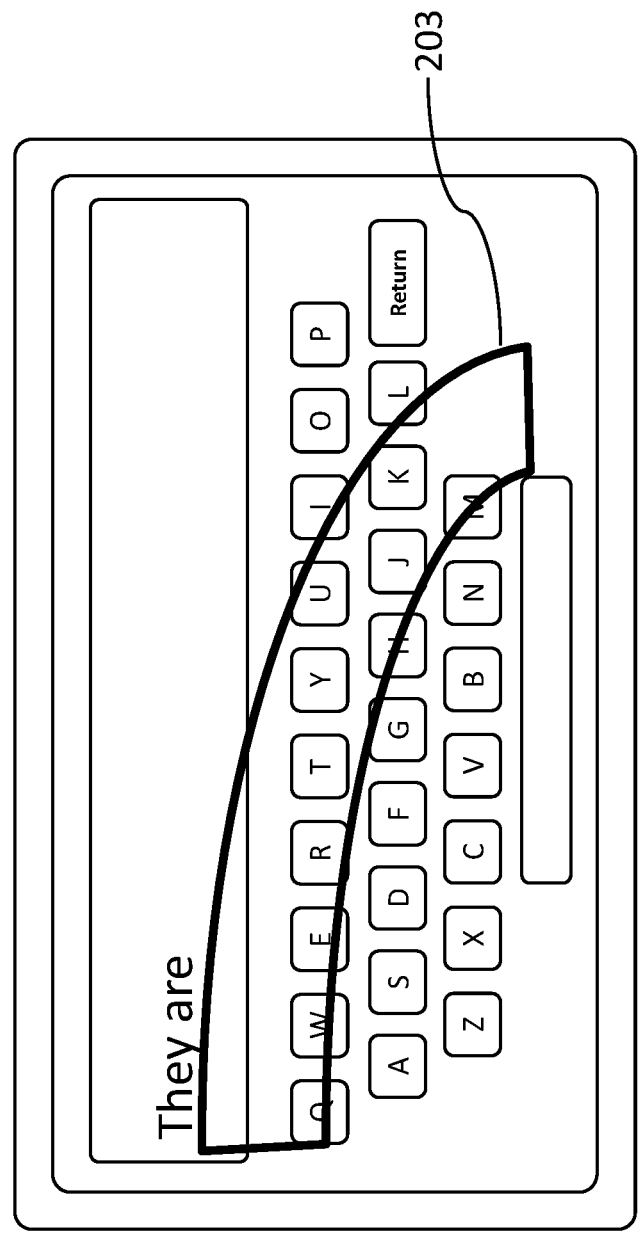
FIG. 2C shows a typical left hand only optimal thumb typing arc movement pattern.

FIG. 2B shows a typical single right hand usage thumb qc arc 202 overlaying a standard QWERTY keyboard. FIG. 2C shows a typical single left hand usage thumb qc arc 203 overlaying a standard QWERTY keyboard.

Bottom ARCS

The bottom arc is another common arc pattern frequently seen with single hand use, particularly when the palm is minimally involved with cradling. This involves near and far thumb positions located on opposite sides near the bottom of the keyboard. The resulting arc resembles a flattened semi-circle, arching slightly upward in the middle of the keyboard, then down at the keyboard sides.

Figure 2D:
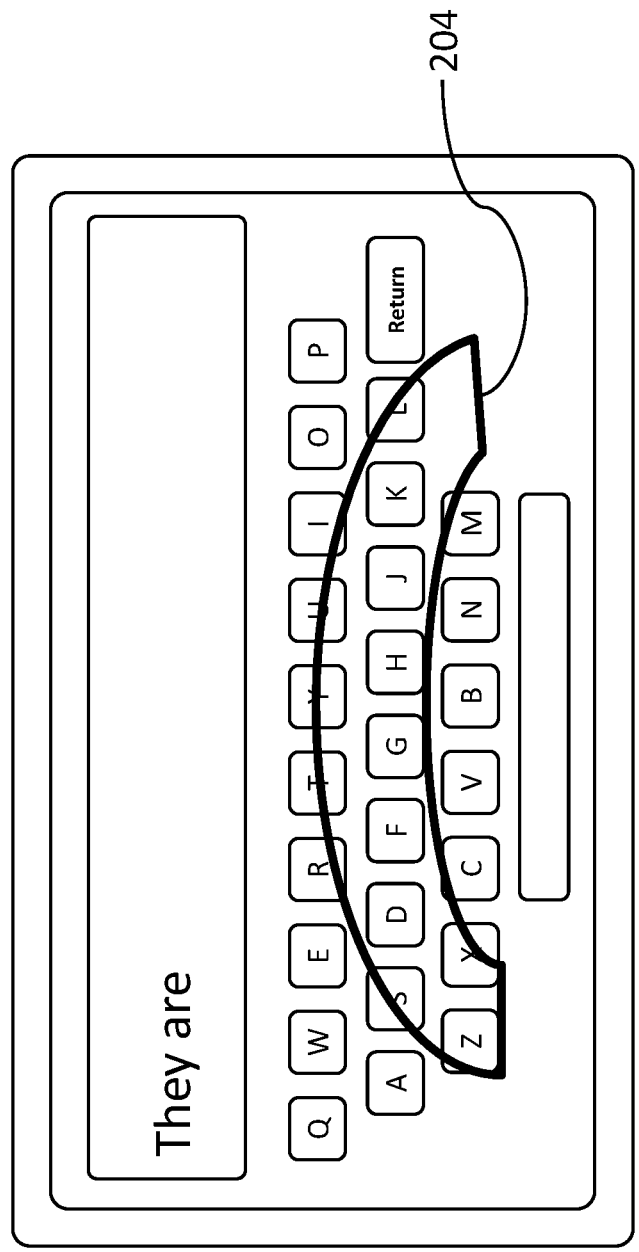
FIG. 2D shows a typical single hand palm cradling optimal single thumb typing arc movement pattern.

FIG. 2D shows a typical single right or left hand usage bottom thumb qc arc 204 overlaying a standard QWERTY keyboard, with the device being used in landscape orientation.

Keyboard Layout for Optimal Thumb Typing

In QUERTY keyboards, some of the most frequently used keys are located in the most awkward and difficult thumb typing positions, while some of the least frequently used keys are in the most convenient arc thumb typing positions. This is particularly true with the more common thumb typing patterns such as the qc arc.

This invention relocates the most frequently used letter/keys into optimal thumb typing locations, while moving the most infrequently used letter/keys away from such optimal locations. This can involve selectively swapping locations of high and low priority keys, particularly keys relatively near each other.

Alpha/Beta Key Swapping

The following example is based on QWERTY keyboards and qc arc optimal thumb typing positions.

There are numerous statistical methods for measuring letter frequency, for example general frequency or frequency in the most common words; but though producing differing results, general patterns are very clear and also relatively consistent across a number of major languages, particularly European.

Wikipedia has an excellent, authoritative survey of such measurements at www.wikipedia.org/wiki/Letter frequency.

This research shows the general pattern of English letter frequency, from highest to lowest, going from left to right: E, T, A, O, I, N, S, H, R, D, L, C, U, M, W, F, G, Y, P, B, V, K, J, X, Q, Z This data is corroborated by recent Google research analysis showing the 12 most common English language letters to be F, T, A, O, I, N, S, R, H, L, D, C, U. See www.norvig.com/mayzner.html.

Alpha keys are very high frequency letters located OUTSIDE of sweet spots, in particular A, S, O, L.

Beta keys are low frequency letters located in ergonomically desirable sweet spots for thumb typing for example based on qc arcs. Beta keys may be Y, U, B, C F, G, V, J.

Figure 7A:
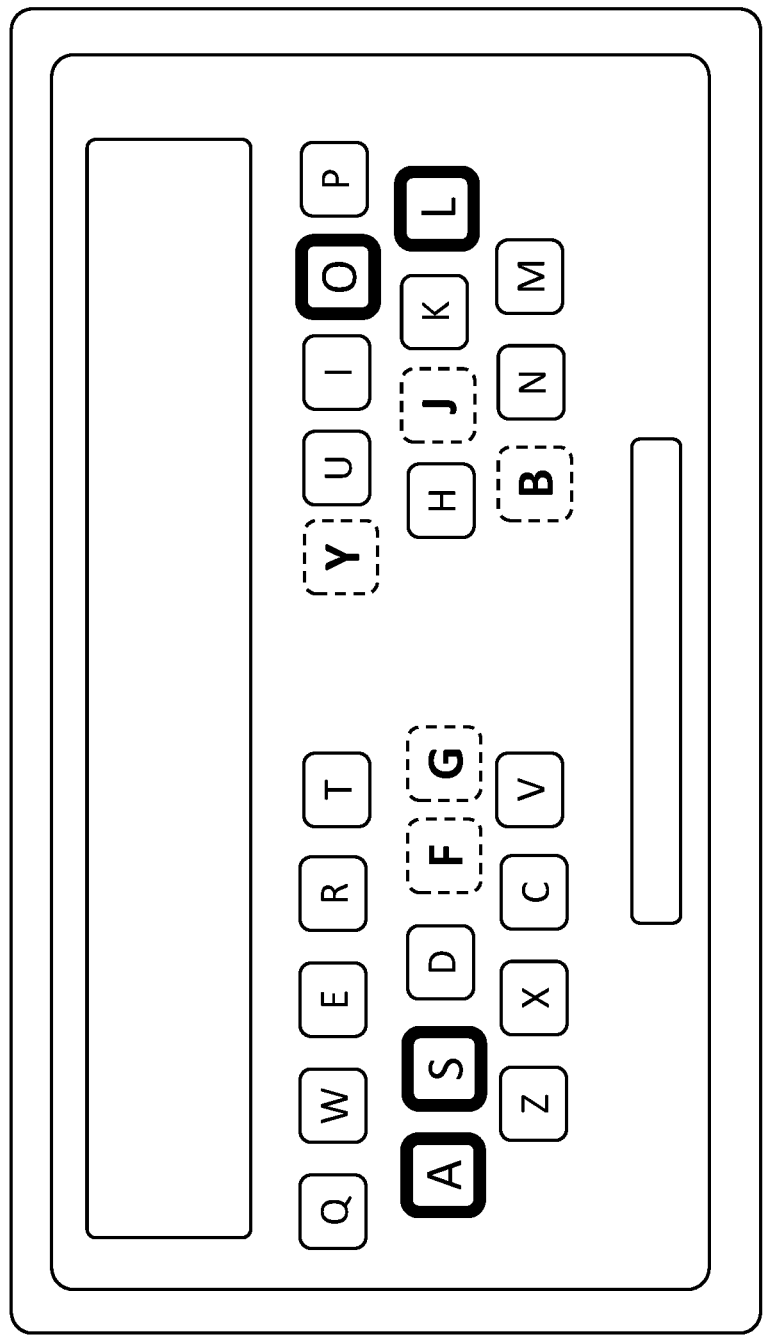
FIG. 7A, shows the static QWERTY keyboard positions of very high and very low frequency letters.

Alpha and beta keys are shown in FIG. 7A, where Alpha keys have highlighted borders and Beta keys have dashed borders.

In an embodiment, in certain situations Alpha and Beta keys can be swapped, repositioning certain keys to more ergonomically advantageous locations while minimizing deviations from the standard QWERTY layout.

Shown below is a QUERTY keyboard layout with Alpha and Beta letters in large bold font, with Alpha keys additionally underlined.

QWERTY Left side rows:
Q, W, E, R, T
A, S, D, F, G
Z, X, C, V
QWERTY Right side rows:
Y, U, I, O, P
H, J, K, L
B, N, M The most difficult to use Alpha keys for thumb typing on QUERTY keyboards tend to be A, S, L because of their location closer to the edge of the device, and thus the palm, which forces the thumb to bend and flex inward uncomfortably.

This analysis suggests significant ergonomic improvements simply by swapping a small number of letters with nearby neighbors, while largely preserving the familiar general QUERTY layout.

For example left side ergonomic improvements are possible by directly swapping Alpha group A, S with either Beta group F, G or D, F, relocating Alpha letters A, S to sweet spots, while preserving much of the normal row key ordering. At a minimum there's a strong benefit to Alpha A swapping locations with either Beta D or G.

On the right side keyboard a clear ergonomic improvement is made by swapping Alpha key L with either Beta keys J or K.

Figure 7B:
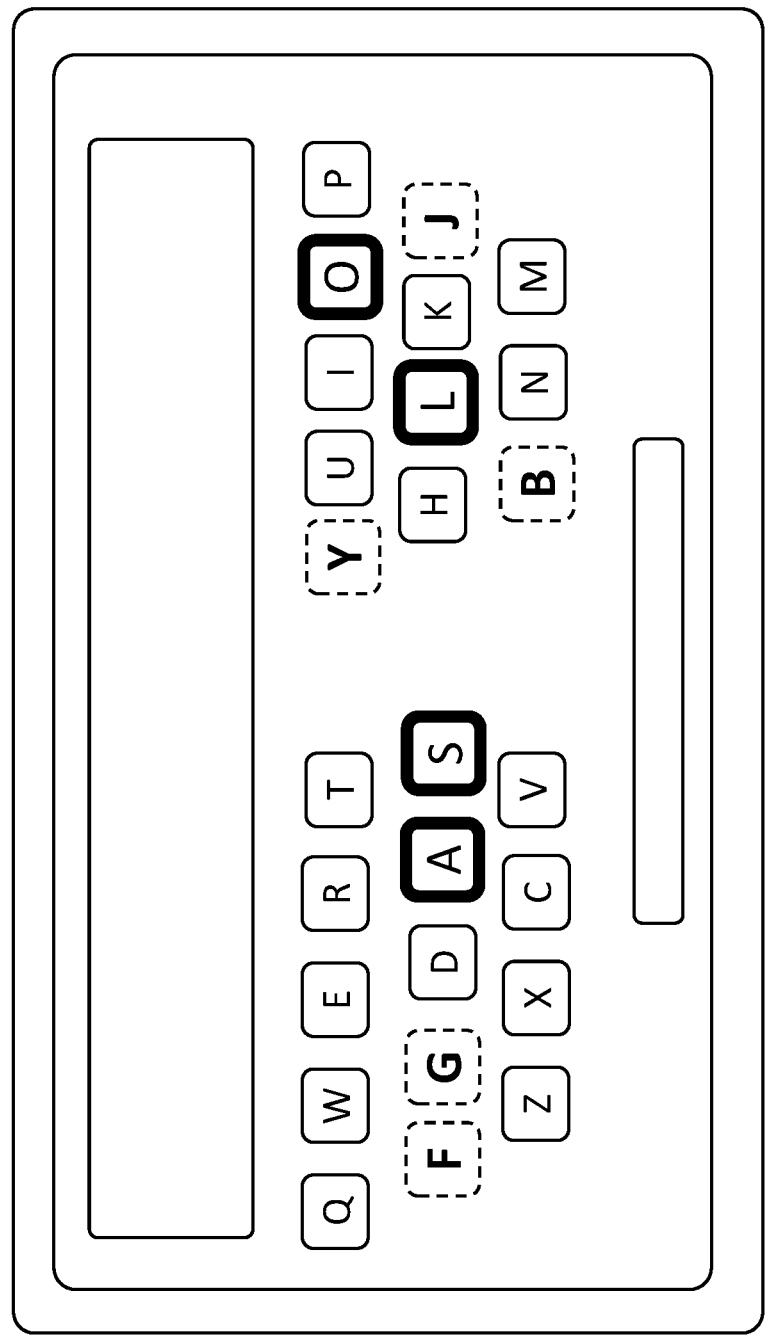
FIG. 7B shows how high and very low frequency letters can swap positions for improved thumb typing ergonomics.

FIG. 7B shows Alpha group A, S swapped with Beta group F, G, and Alpha L swapped with Beta J.

Sweet spots, and therefore specific Alpha and Beta letter keys, can vary depending on keyboard type (for example QUERTY), thumb position relative to specific keys, hand size, hand cradle position, device and screen size, screen orientation, normal or split keyboard modes, keyboard location, and factors like key size and shape, etc.

Limited Key Menu Sets

In this context, "word fragment" is defined as one or more letters, which are building blocks of words. When typing text, the next possible word fragments and their representative keys can be dynamically and contextually prioritized based on things like word, letter frequency analysis, and word completion trees. This allows totally irrelevant, lowest priority keys to be filtered out, resulting in limited key sets, with the potential for larger, easier to use keys.

In most typing and editing scenarios only a small subset of letters or word fragments are actually highly relevant at any given moment. For example research from organizations like Project Gutenberg (www.en.wikipedia.org/wiki/ Project Gutenberg) suggests that just seven letters, T, A, S, H, I, W, and O, with relative frequencies of 17%, 12%, 8%, 7%, 7%, 7%, and 6%, respectively, account for almost 65% of starting letters of all English language words.

An additional 4 letters B, M, F, and C with relative frequencies of 4.5%, 4.0%, 3.8%, and 3.5%, respectively, account for an additional 16% of starting letters. Thus just eleven letters collectively account for about 80% of all starting letters.

Figure 8A:
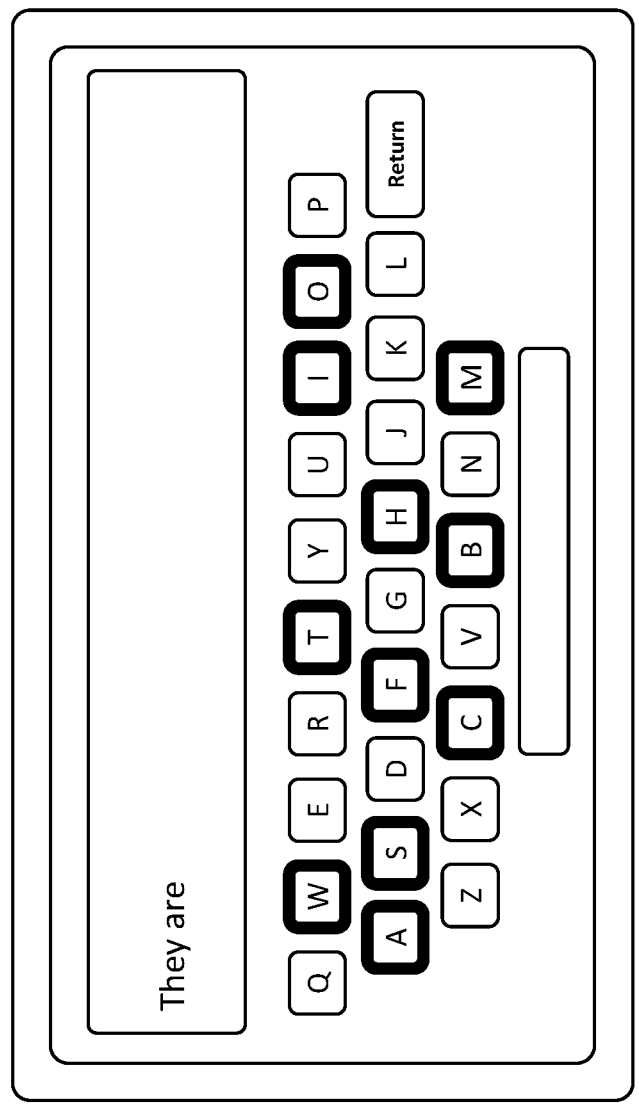
FIG. 8A shows a QWERTY keyboard with high priority keys in bold outline.

FIG. 8A shows these 11 most relevant, highest priority keys in standard QWERTY layout, highlighted with bold borders. FIG. 8C shows just these same eleven keys, with larger sizes, while retaining normal QWERTY relative position.

An additional 5 letters E, N, P, D, and L with relative frequencies of 2%, 2.5%, 2.5%, 2.7%, and 2.7%, respectively, account for another 12.5% of starting letters, thus sixteen letters account for about 92% of all starting letters.

The least common letters V, J, K, Q, X, Z collectively account for only about 2% of all starting letters.

Additional analysis of individual writing patterns in specific circumstances, can better identify the most and least relevant letter keys, which will typically show that many keys are totally unnecessary, while others are highly important and relevant.

Thus in any typing scenario, it can be demonstrated that a large amount of limited and precious keyboard space is potentially wasted on virtually irrelevant keys, space which could be better used by more relevant, higher priority keys.

This analysis suggests that the highest priority keys can be given significant additional size at almost no cost, making the most relevant keys much easier to use on cramped screens, while very importantly retaining the user's preferred, familiar, general standard keyboard layout (for example QWERTY), if desired.

For example when high priority keys are adjacent to very low priority keys, high priority keys can expand in size into or across nearby dead (irrelevant key) spaces, though potentially creating moderately non-uniform or rectangular key shapes.

Figure 8B:
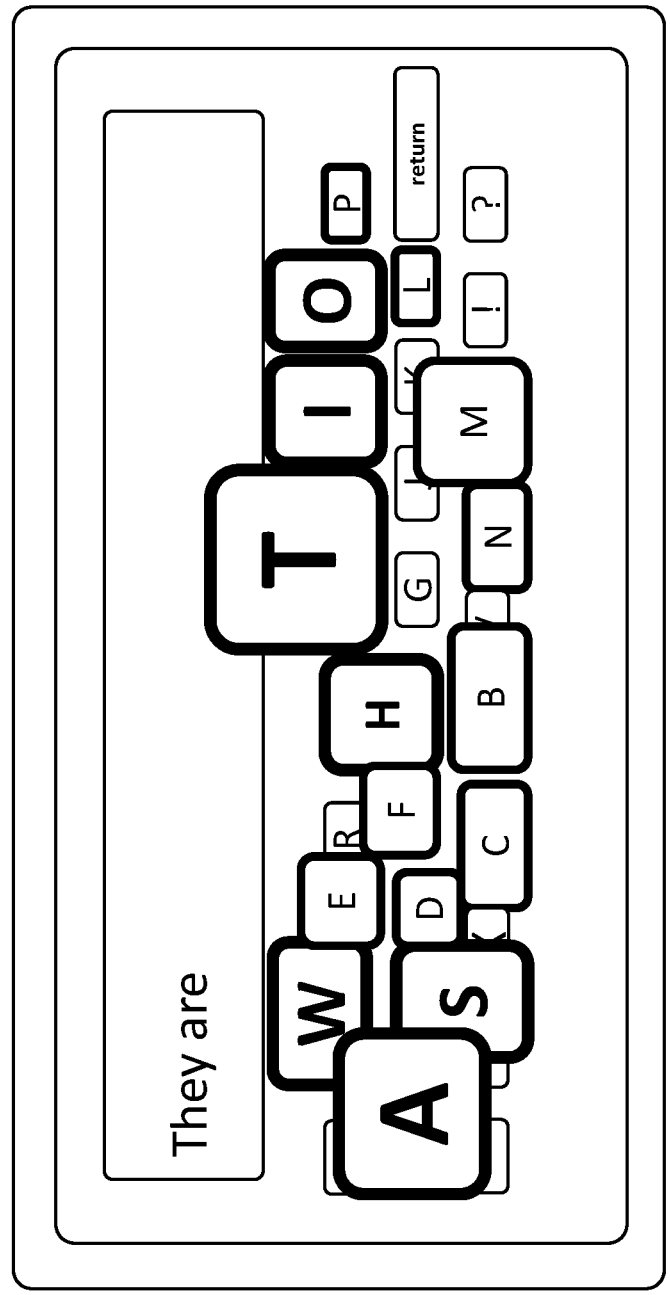
FIG. 8B, 8C, 8D show QWERTY keyboards with reduced key sets and high priority keys in larger sizes.
Figure 8C:
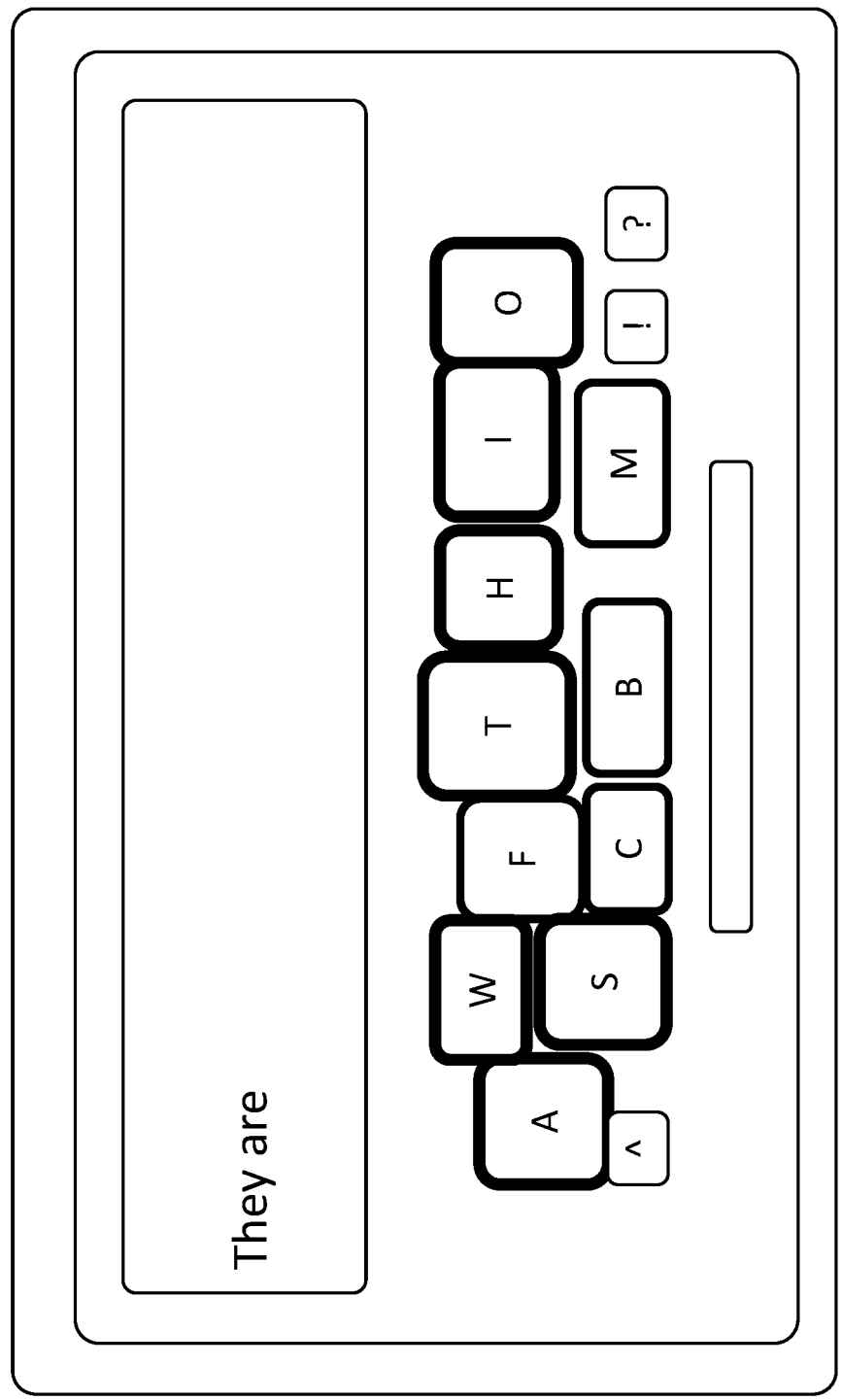

However, hidden very low priority keys can still remain accessible in an alternate keyboard toggled by control keys or other means FIG. 8B shows the sixteen most relevant, highest priority keys made larger size at the expense of lowest priority keys, where relative size is largely, but not exclusively, determined by standard starting letter relative frequency, thus highest frequency T, A, S, H, I, W, O letter keys are the largest. Higher priority keys can also be given greater visibility via larger fonts and multiple highlighting strategies. Thus in FIG. 8B the most relevant letters T, A are shown with much larger font sizes and thicker key borders. The T key in particular is given significantly larger size since it is surrounded by largely irrelevant low priority letters. The T key in FIG. 8B is shown with optional overlap of the editing area. Notably FIG. 8B shows that larger keys remain located in their general, normal and familiar layout locations, QWERTY in this example, which eliminates the need to learn a totally new keyboard layout.

Keys may also expand in size such that they temporarily overlay edit content areas. Translucence can allow overlaid areas to remain partially visible; for example low priority keys can be overlaid with larger, translucent high priority keys, thus remaining visible and also selectable by gestures like directional swipe or longer key press, etc.

When the number of relevant keys is fairly small, it becomes possible to layout keys in a simple, universally and quickly understood alphabetical ordering, which is completely independent of any proprietary keyboard layout.

Word Completion Trees

Longer words can be constructed from shorter words, which can be seen in the Scrabble word game Dictionary tools, which show word derivation relationship maps. The letters or shorter word fragments which connect these derived words can be used to represent keyboard key values. Thus words can be constructed from a sequence of short word fragments, which function as partial word completions.

A word fragment, or just "fragment", is defined in this context as one or more letters, which function as building blocks of longer words, where fragments themselves can potentially be complete words.

Word completion tree analysis shows that even after typing just a few letters, the relevant next letters or word fragment choices becomes dramatically reduced. For example according to Merriam-Webster Official Scrabble Players Dictionary (OSPD), "MAIN" is both a word, and also the starting root word fragment of approximately 35 other words, deriving from any of these letters: "F, L, M, S, T" appended to the end of "MAIN". This suggests the other 21 keys and letters on the keyboard are completely irrelevant and wasted space.

Traditional keyboards, like QWERTY use static layouts of single letter (fragment) key input to construct words, thus always requiring a full alphabet of keys.

The typing of words on can be described as navigating or walking down the branches of a word completion tree, via groups of related nodes representing menus of letters or fragments, where conventional keyboards use exclusively static single letter keys.

A much more compact form of this type of tree has groups of normally branch, sibling related nodes representing longer word fragments consisting of one or more letters. For example the word "MAINTAINING" can be formed from appending the fragments "MAIN" "T", "AIN", "ING" in the left to right sequence shown.

This differs from traditional word completion methods which normally offer suggestions of entire words or fully complete word endings.

By contrast, the invention uses a word completion tree which incrementally constructs longer words from shorter fragment building blocks, which are not necessarily complete word endings.

The starting fragment of every word effectively forms the root parent node of a word completion tree, with descending branches represented by child word fragment nodes, where each letter or fragment in a word represents a node in a word completion tree.

Each node can be the parent of child nodes extending downwards another branch level. This branching pattern is repeated downwards until all possible words deriving from the starting root node fragment are represented, where terminal nodes (those lacking child nodes) represent the final fragments of complete words. Thus traversal from the top root node to any terminal node represents a unique node path, which constructs a completed terminal word by incrementally concatenating each currently traversed node word fragment value to the sum composite value of all the previously traversed ancestor nodes in the path, starting from the root node.

Thus trees can be built from a set of the most common intermediate step fragments, represented as nodes, which provide fast and easy navigation to every possible terminal word derivable from any root or node fragment anywhere in the tree. A set of normally sibling node fragment values can be represented as a dynamic keyboard menu, with each key representing a discrete node fragment value or related derived value.

As words are typed, each additional letter or fragment entered greatly reduces the number of relevant next letters or fragments choices, particularly after just the first 3 starting letters of most words. Fewer keys allows the most relevant ones to become larger, making them easier to use on small screens.

For example in co-pending applications PCT/US2014/31121, US2014/776,742 there is disclosed limited menu key sets based on word fragment completion building blocks, where the most relevant keys become easier to use by temporarily increasing relative size and highlighting, while also de-emphasizing less relevant keys via any combination of decreased relative size, disabling, un-highlighting, graying out, or hiding, etc.

Figure 9A:
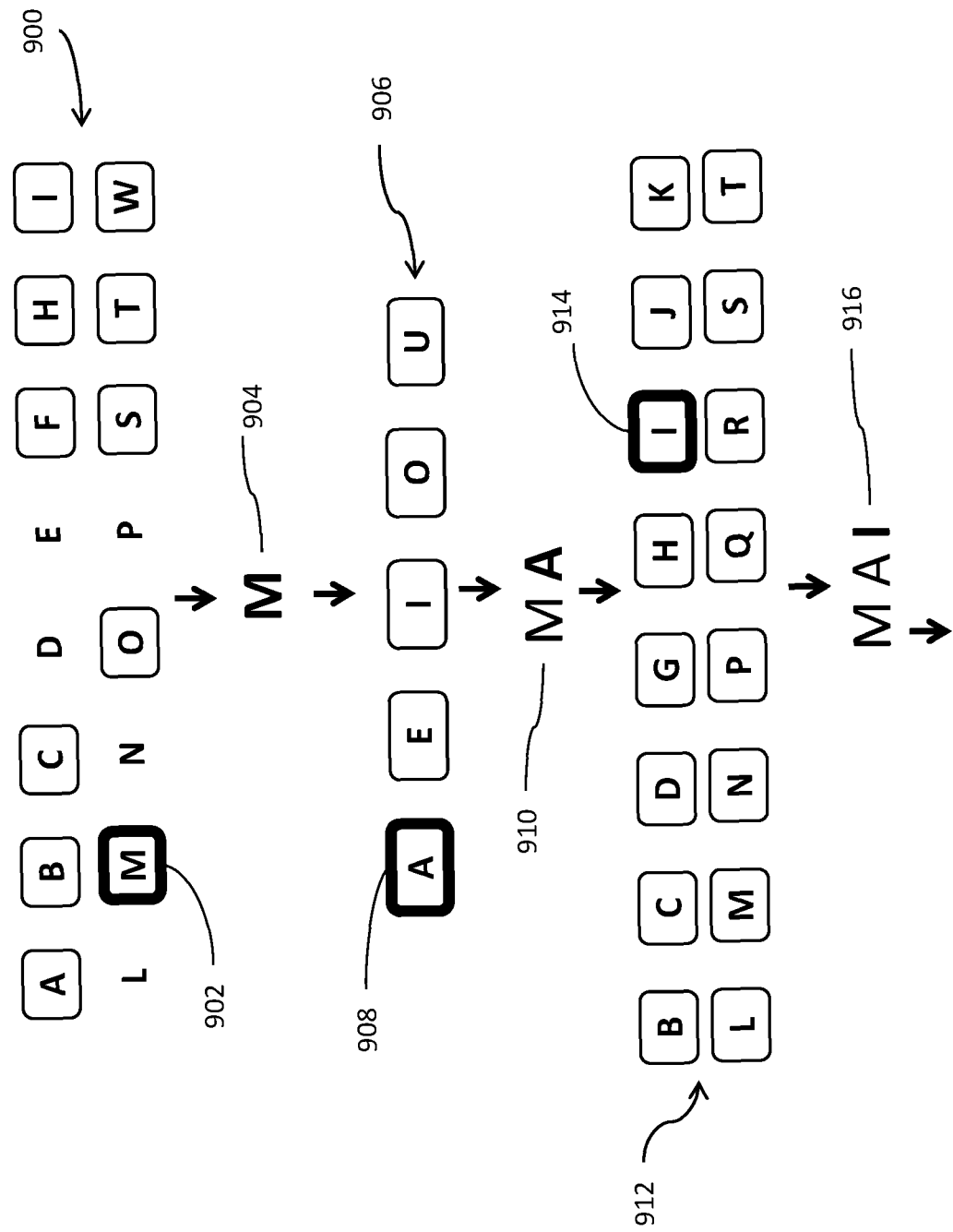
FIG. 9A, 9B. 9C shows a full word typing word completion tree example, starting in FIG. 9A, continuing in FIG. 9B, and completing the process in FIG. 9C.
Figure 9B:
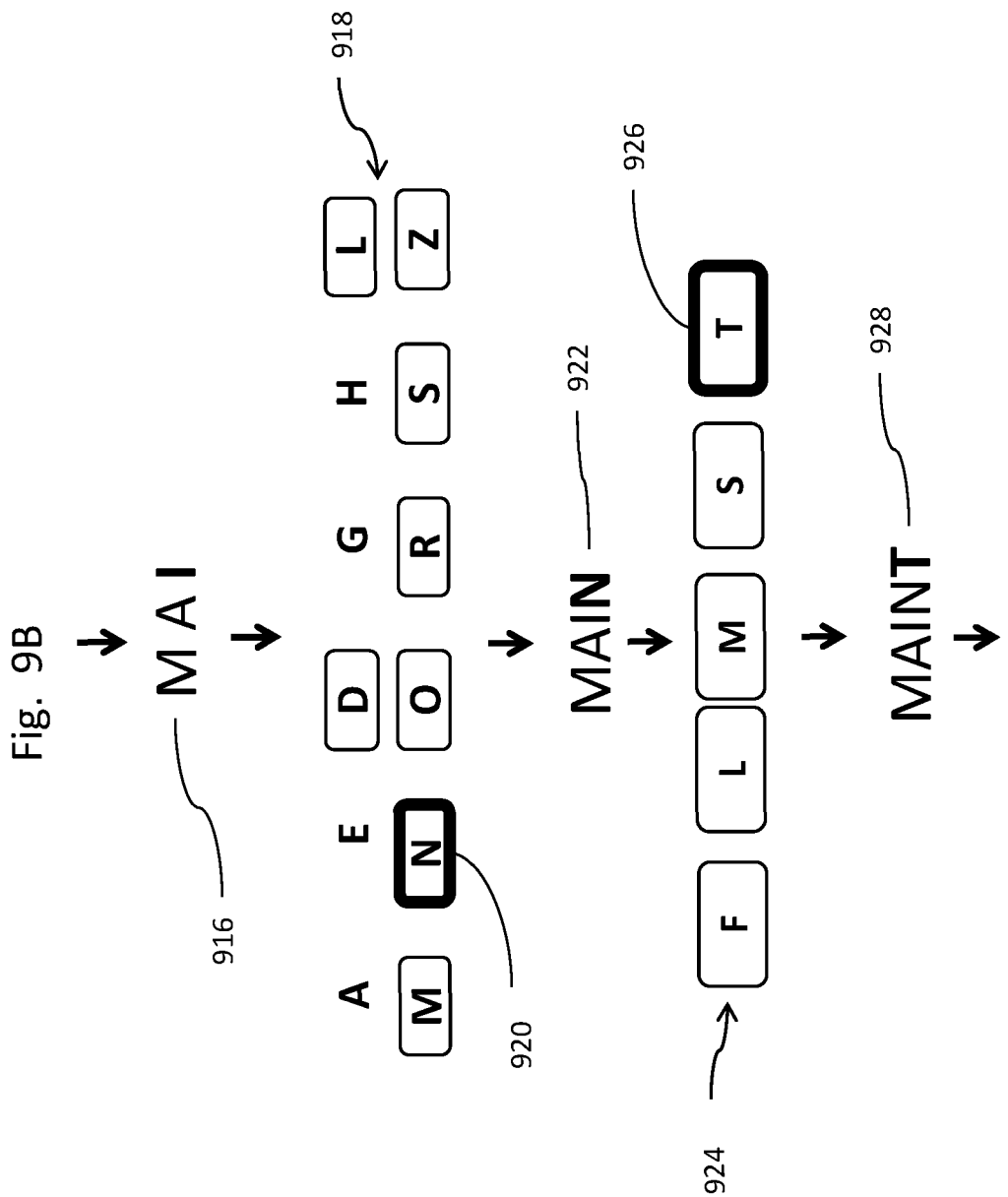

FIGS. 9A, 9B and 9C illustrate how typing the word "MAINTAINING" traverses a word completion tree, and where selected keys are shown with bolded borders. At each typing step the user is presented with a different limited key menu set (or just "key menu"), representing the most likely next letters or word fragments. Starting in FIG. 9A the user begins typing a new word using key menu 900, consisting of 16 letters representing 92% of the most frequent first letters of all English words.

From key menu 900, initial letter 'M' (902) is selected, resulting in initial word fragment 904. Next, this triggers display of vowels key menu 906, from which the letter 'A' (908) is selected, creating new word fragment 'MA' (910), triggering display of the next key menu 912. Next, the user selects key 914, the letter 'I', creating word fragment "MAI" (916).

Figure 8D:
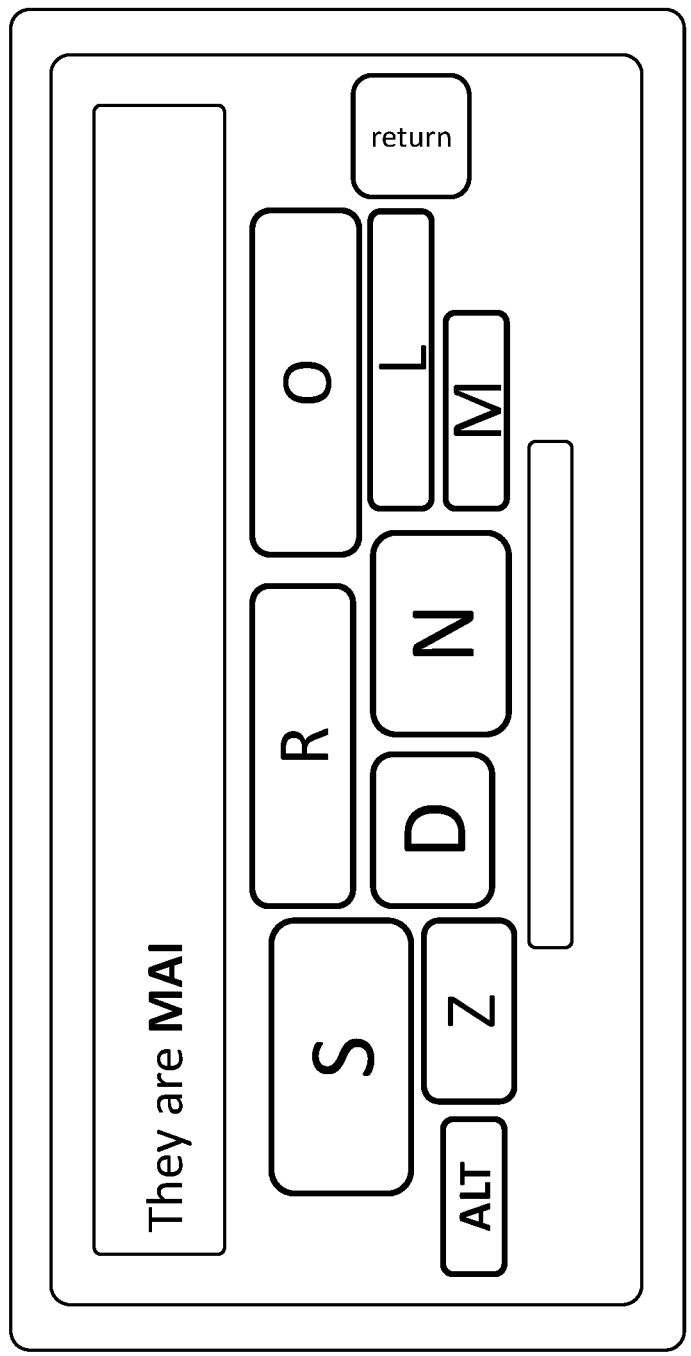

Next, continuing in FIG. 9B, display of key menu 918 is triggered, with lowest priority letters shown without borders, letters which could potentially be not displayed. FIG. 8D shows how the 8 highest priority letters in 918 might be laid out with relative sizes reflecting relative priority. From menu 918 the letter 'N' (920) is selected and concatenated to "MAI" fragment 916, creating new word fragment "MAIN" (922). This triggers display of key menu 924, containing the only letters "F, L, M, S, T" that can validly follow "MAIN". Next the letter 'T' (926) is selected and concatenated, resulting in word fragment "MAINT" (928).

Figure 10:
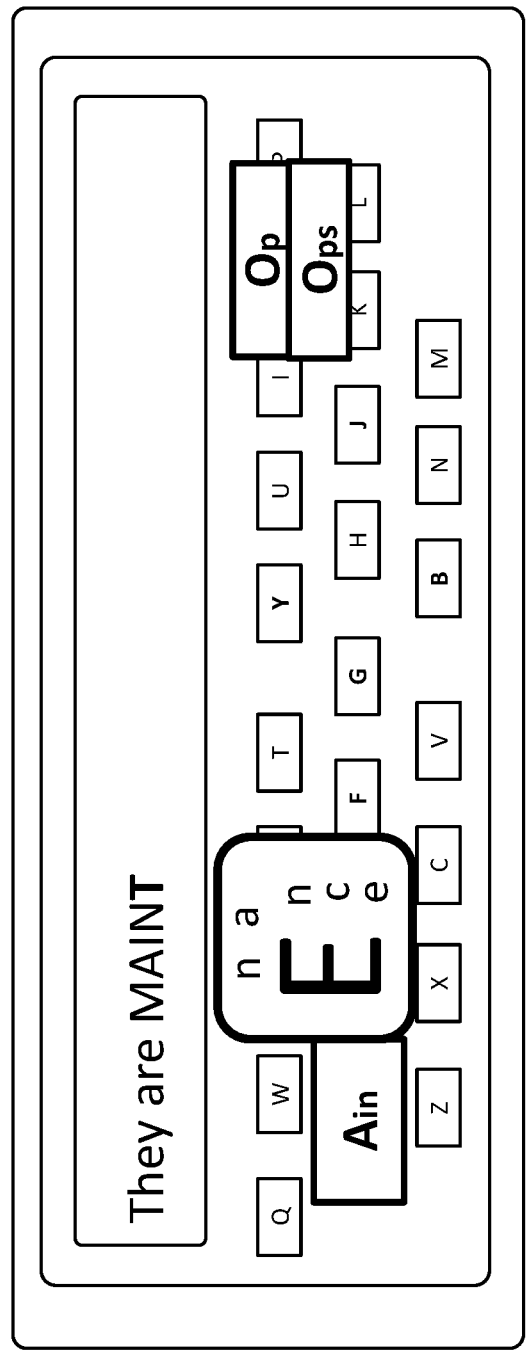
FIG. 10 shows innovative, condensed display formats for keys showing longer word fragments.

Next, continuing in FIG. 9C, "MAINT" triggers display of key menu 930, containing longer and terminal word fragments ("AIN, ENANCE, OP, OPS"). Selection of "AIN" (932) results in "MAINTAIN" (934), triggering display of potential ending key menu 936 ("S, ER, ED, ING"). Selection of "ING" (938) results in the terminal word "MAINTAINING" (940). FIG. 10 shows a sample of how key menu 930 keys might be displayed, notably condensing the "Enance" key considerably, in an alternate display method to help conserve screen space.

In many key menus the key set can be further reduced by eliminating the lowest priority letters/word fragment choices, thus freeing up even more screen real estate. For example in FIG. 9A, initial key menu 900 shows 11 keys with borders which collectively represent 80% of all word starting letters. In FIG. 9B, key menu 918 also shows higher priority (high frequency) letters with borders.

Context can help further reduce key menu set size, where context can include grammatical rules, semantic meaning, usage history and common speech and language patterns. Significantly, context can involve word frequencies of potential terminal words deriving from the currently typed word fragment root. For example "MAIN" is both a terminal word, and the starting root word fragment of approximately 35 other descendant words, deriving from any of the letters "F, L, M, S, T" (FIG. 9B, menu 924) appended to the end of "MAIN". Therefore the likelihood of any of those 35 words being the user's intended word can inform the relative priorities and display of keys in the current "F, L, M, S, T" key menu. For example context informed frequency analysis will probably reveal only a small relatively high priority subset of the 35, with a fair number of highly unlikely low priority words. For example "MAINFRAME" is the only valid word derived from "F" appended to "MAIN", thus depending upon context, suggesting "F" in key menu 924 might be totally irrelevant, or very low priority, allowing non-display of "F" or a reduced relative display size.

However a key menu element with many high frequency, high priority derived terminal words, could raise the relative display priority of that element. It could also trigger addition of the element's derived word or word fragments to the current key menu. For example in FIG. 9B, it might be determined that derivations of letter "T" (926) in key menu 924 are highly likely to include the user's intended word, thus longer "T" derived word fragments could become elements of key menu 924. For example if "MAINTAIN" seemed the most likely intended word, then word fragment "TAIN" might be added to key menu 924, providing a shortcut construction of "MAINTAIN", potentially reducing total keystrokes.

The goal of each menu key set is to provide the user with the fewest, but most visible, easiest to use partial word completion word fragment shortcuts, where some may be terminal word endings, or even complete words as seen in traditional word completion menus.

Another example is when typing "MAINTAIN" when preceded by sentence fragment "They are", a context which makes the terminal ending options "S, ER" in FIG. 9C, key menu 936 grammatically invalid, meaning they can be potentially removed. The priority of each key menu element thus involves multiple factors, which includes context and the collective priority of all possible terminal words derived from each element. Such predictive priority analysis becomes more important with larger key menu sets as a means to free up scarce crowded screen real estate by removing or shrinking low priority keys and expanding the relative sizes of higher priority keys.

Even in the complete absence of context, for example a blank edit box, the frequency of common starting letters can be used to determine the elements of the starting key menu set, including relative priority and display size; For example just two letters "T, A" account for about one third of all starting letters, and seven letters "T, A, S, H, I, W, O", with relative frequencies of 17%, 12%, 8%, 7%, 7%, 7%, 6% respectively, collectively account for almost 65% of all starting letters of all English language words (with similar frequency patterns in most languages). The very high frequency and higher priority of "T, A" letters is reflected in FIG. 8B, which shows much larger key sizes for both letters.

Co-pending applications PCT/US2014/31121, US2014/776,742 also disclose variable, dynamically changing layout options for limited key menu sets.

Arc motion ergonomic thumb typing optimization is a layout format option ("arc layout") applicable to limited key set menus, such as those described in co-pending applications PCT/US2014/31121, US2014/776,742 particularly because irrelevant keys in arc locations do not require re-positioning, as they can simply be temporarily overlaid with relevant keys.

ARC Layout Rules for Limited Key Menu Sets

The arc layout of such limited key menu sets is governed by a set of simple rules.

Limited menu key sets can be arranged in optimal arc like thumb typing patterns, such as those described here (dual and single qc arcs and bottom arcs).

Key menus are allowed to extend off screen and the user can scroll the menu in either direction to bring appropriate keys into view. In thumb typing arc menu layouts as described here, the scroll direction can mirror the curvature of the arc.

Keys can expand to fill extra space for example if there's an uneven balance of keys, resulting in non-uniform sizes and shapes.

Keys can have non-uniform sizes and shapes, and don't have to be square or rectangular in shape they can be sectional "slice" like regions of an arc like shape.

Menu set keys can overlap each other to achieve greater economy of space.

Keys can overlap other lower priority keys underneath, which can optionally be shown via translucence, and remain selectable via gesture.

Keys can overlap editing content areas, particularly where thumb typing arcs typically intersect or overlap edit content typically at the top left, right sides of the virtual keyboard.

Where other keys are not present, menu set keys can expand in size into those areas, potentially resulting in variable sized, less uniform, more rectangular shaped keys.

Menu keys can have variable sizes and shapes, where larger size typically corresponds to higher priority, and smaller size corresponds to lower priority. Absent space constraints, such as with a very small key menu set, lower priority keys may be displayed in larger sizes similar to higher priority keys.

For example in FIGS. 5A, 5B, 5C, 5D "OP" and "OPS" are relatively low priority keys displayed in larger size, since they're not competing for limited layout space in a small four key menu set.

Higher priority keys can be shown highlighted with various graphic styles and attributes, including relatively larger, bolder label fonts and key borders, including brighter contrasting colors, which also can apply to the key backgrounds. Key borders can also have distinct styles. Multiple highlight blinking strategies can also be employed to give higher priority keys greater visibility—for example a repeating, rapidly changing background, font, or border color.

Alphabetical Ordering—Generally menu set keys are ordered alphabetically going from left to right based on the initial letter of each key word fragment label, starting from the left with the first letter of the key Dual qc arcs, however, can each have independent alphabetical or other ordering, going from top to bottom or vice versa.

Key Label Orientation: menu key letters can have angled orientations which for example might mirror arc curvature. Each key in a menu key set is allowed to have independent letter orientation, and each letter within a particularly key label can also potentially have independent orientation.

Key Label Fonts: each individual key in a key menu set can have its own individual fonts and attributes like size, style and color, and each individual letter within a given key label can similarly have such independent attributes. For example in FIG. 5A, 5B, 5C, 5D and FIG. 10 the "Enance" key is shown with a larger capitalized 'E'.

The limited menu key sets shown in most of the diagrams derive from the FIGS. 9A, 9B, 9C "MAINTAINING" word completion menu tree example (or just "FIG. 9 word example").

In most of the limited menu key set diagrams based on the FIGS. 9A, 9B, 9C word example, the relevant key sets are generally shown in large sizes overlaying QWERTY key layouts underneath. These QWERTY layouts, with the exception of control keys, are normally assumed to be in de-activated state, and are used primarily used to show context, except as otherwise noted.

FIGS. 3A, 3B, 3C, 3D, 3E, 3F illustrate multiple arc layout patterns used in the context of the FIGS. 9A, 9B, 9C word example, where after entering the initial letter "M", the set of vowels "A, E, I, O, U, Y" define the next word completion limited key menu set. 'Y' is generally shown in a relatively smaller key size reflecting its lower priority relative to the other keys in the menu set.

Figure 3A:
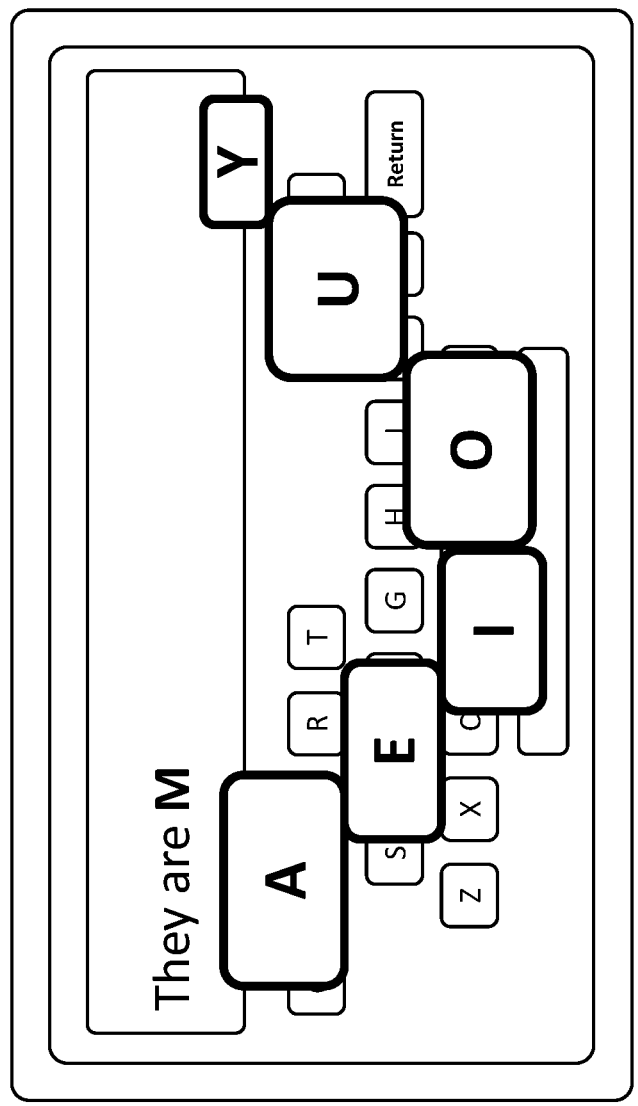
FIG. 3A shows how a small set of vowel keys can be arranged in an optimal double thumb typing arc pattern alphabetical layout.

FIG. 3A shows vowel menu keys "A, E, I, O, U, Y" arranged in typical dual qc arc layout.

Figure 3B:
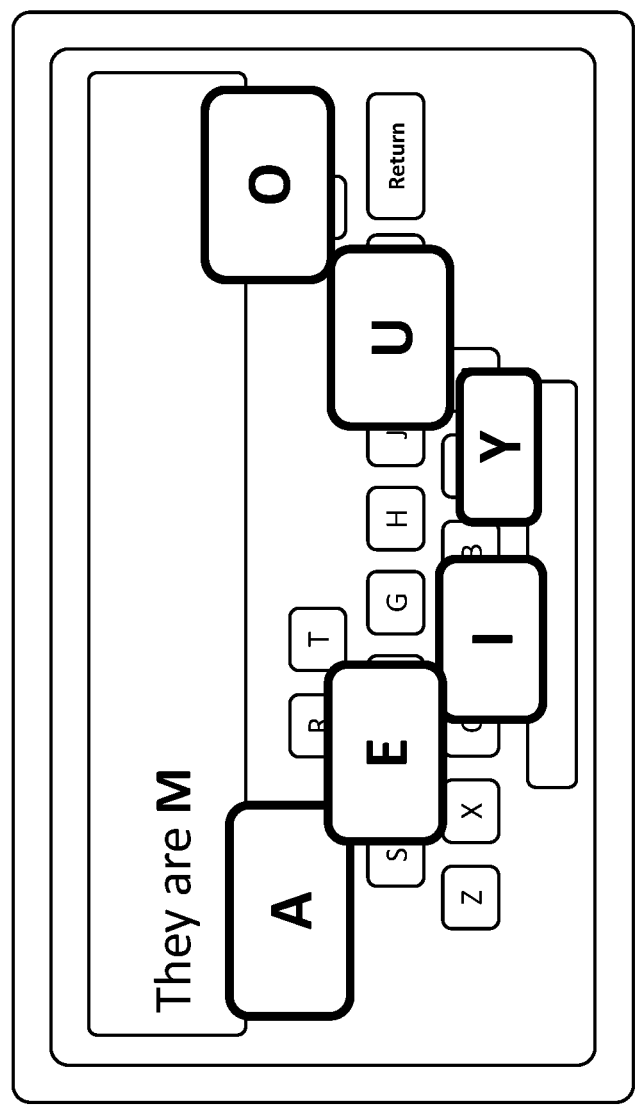
FIG. 3B shows how the same vowel keys can be arranged in double thumb typing arc pattern layouts with separate alphabetical ordering in each arc.

FIG. 3B shows vowel menu keys "A, E, I, O, U, Y" arranged in dual qc arc layout, but ordered alphabetically within each individual arc, starting from the top of each arc, where the left side arc starts from the 'A' key, and the right side arc starts from the 'O' key.

Figure 3C:
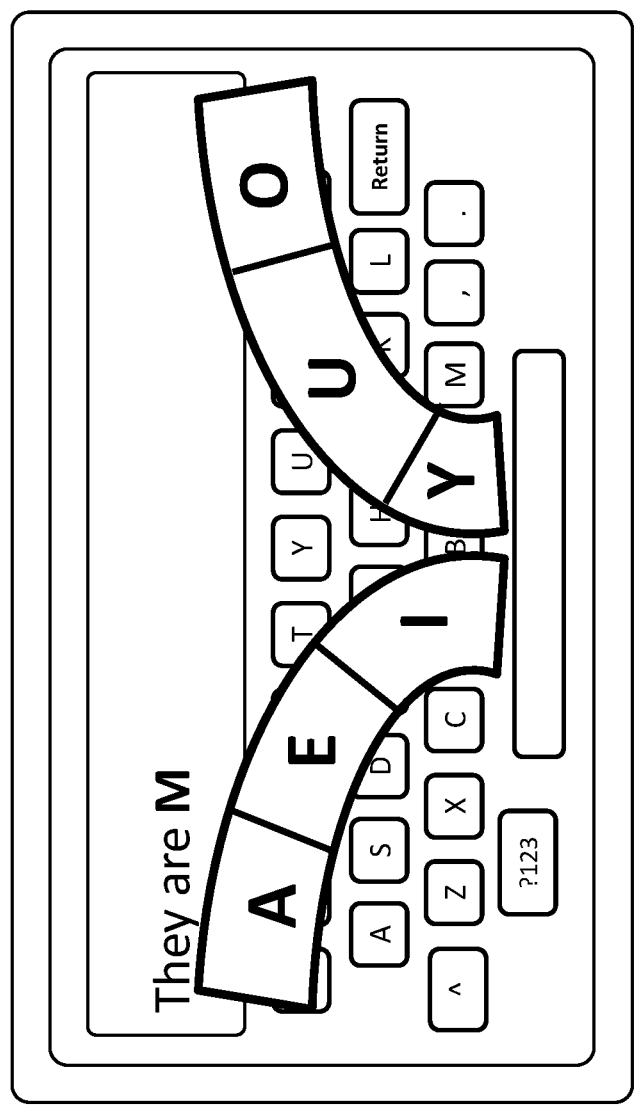
FIG. 3C shows how the vowel set arc layout can be represented without discrete keys.

FIG. 3C shows vowel menu keys "A, E, I, O, U, Y" located in contiguous sectional slice like regions of the dual qc arcs.

Figure 3D:
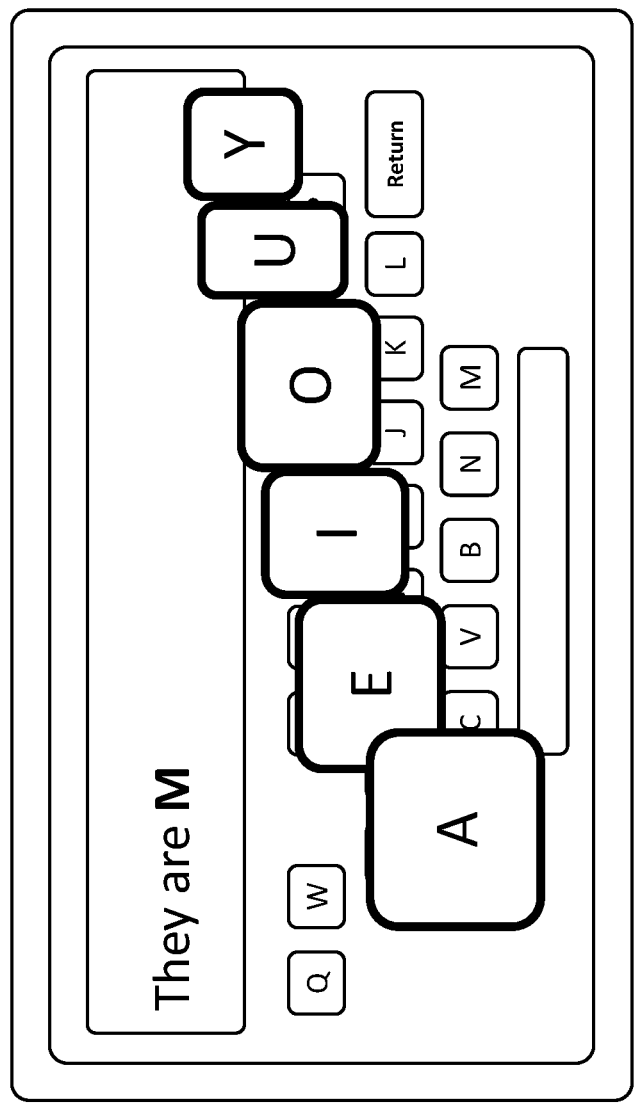
FIG. 3D, 3E, 3F shows how a small set of vowel keys can be arranged in optimal single thumb typing arc display patterns.

FIG. 3D shows vowel menu keys arranged in typical right hand single qc arc layout.

Figure 3E:
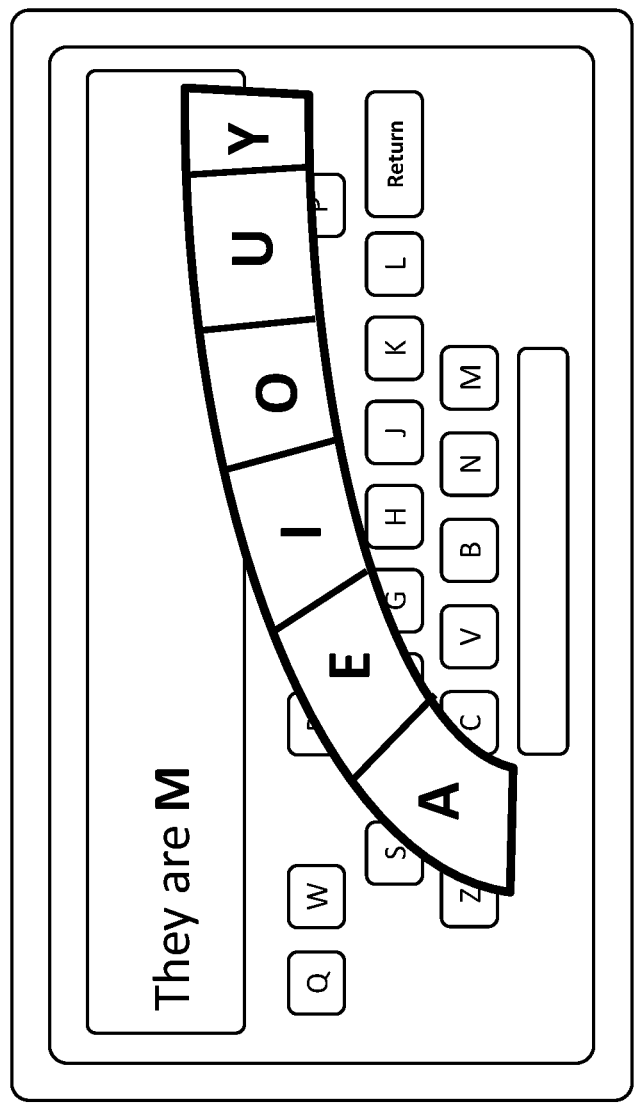

FIG. 3E shows vowel menu keys located in contiguous sectional slice like regions of a single qc arc layout.

Figure 3F:
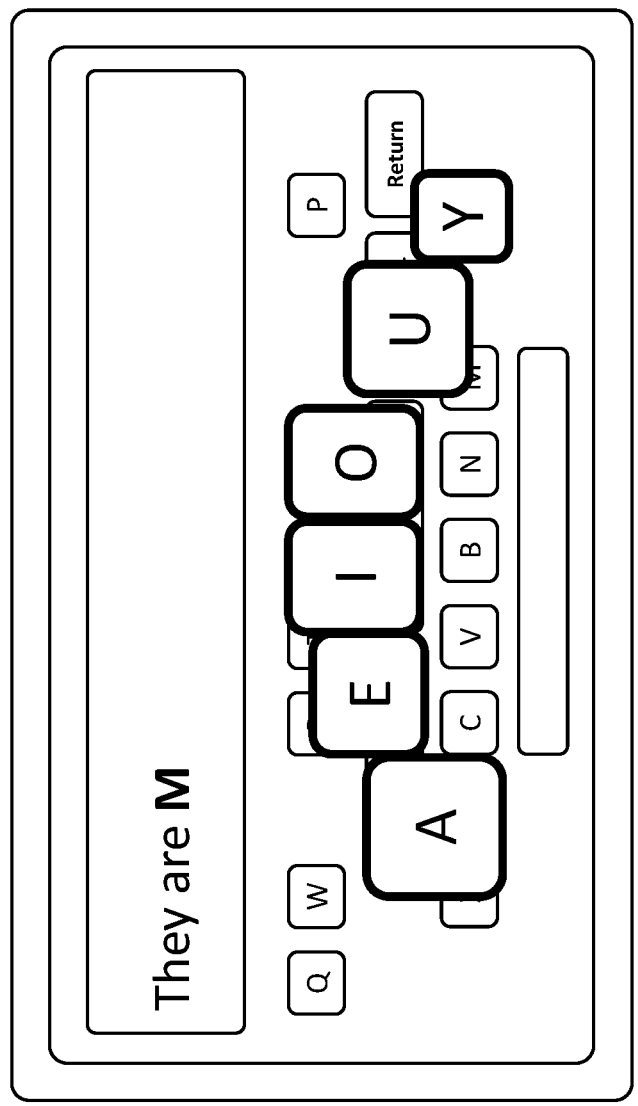

FIG. 3F shows vowel menu keys arranged in a bottom arc layout pattern.

FIGS. 4A, 4B, 4C, 4D illustrate multiple arc layout patterns used in the context of the FIGS. 9A, 9B, 9C word example, showing "N" entered following initial letters "MAI" (creating "MAIN"), producing a next limited key menu set of "F, L, M, S, T" (4A-D menu keys)

Figure 4A:
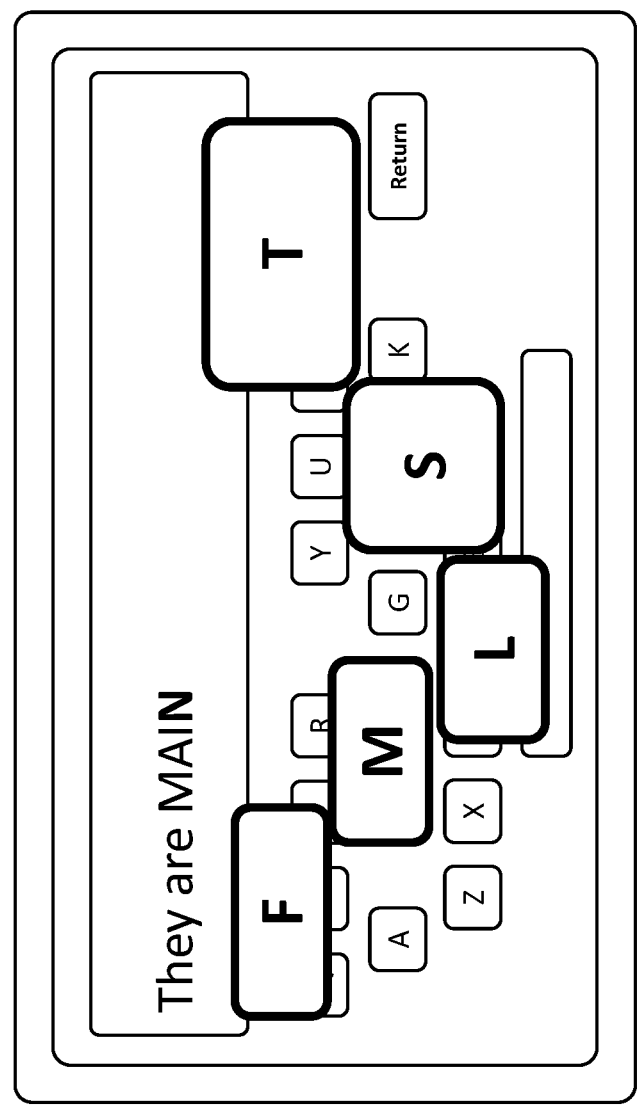
FIGS. 4A, 4B, 4C, 4D, and FIGS. 5A, 5B, 5C, 5D and FIGS. 6A, 6B, 6C, 6D illustrate how various limited key sets, representing various word fragments involved in typing the word "MAINTAINING", can be arranged in common thumb typing arc pattern layouts.

FIG. 4A shows 4A-D menu keys arranged in typical dual qc arc layout.

Figure 4B:
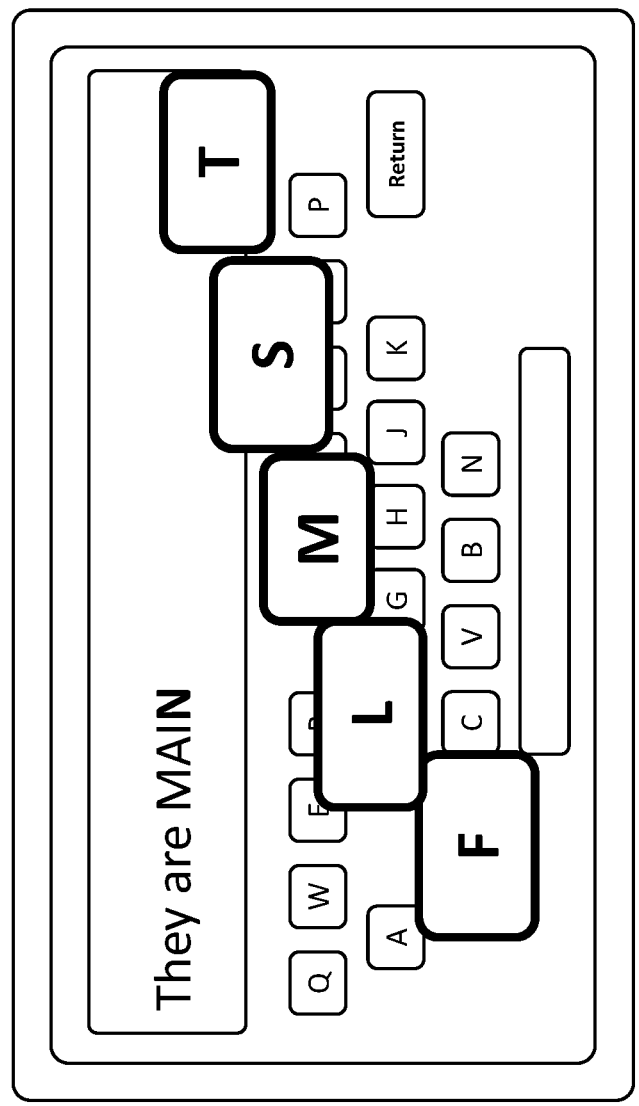

FIG. 4B shows 4A-D menu keys arranged in typical right hand single qc arc layout, where each key is a contiguous sectional slice like region or the arc.

Figure 4C:
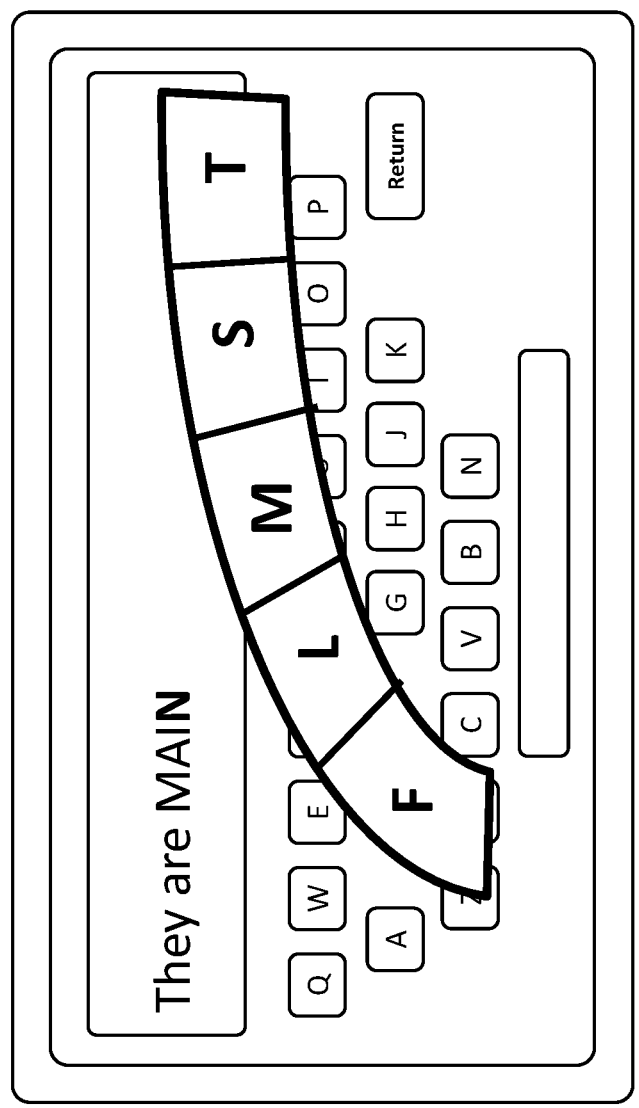
Figure 4D:
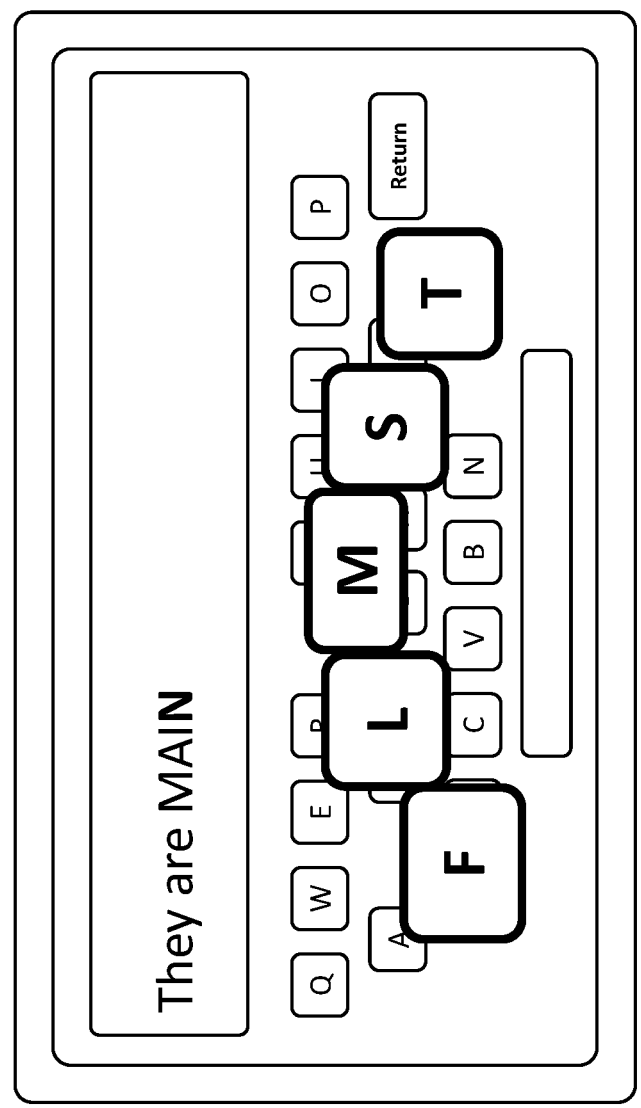

FIG. 4C shows 4A-D menu keys arranged in typical bottom arc layout.

FIGS. 5A, 5B, 5C, 5D illustrate multiple arc layout patterns used in the context of the FIGS. 9A, 9B, 9C word example, showing "T" entered following initial letters "MAIN" (creating "MAINT"), producing a next limited key menu set of "AIN, ENANCE, OP, OPS" (5A-D menu keys). The "OP" and "OPS" keys are relatively low priority, but since they're not competing for limited layout space in a small 4 key menu set, they can be displayed in larger size.

Figure 5A:
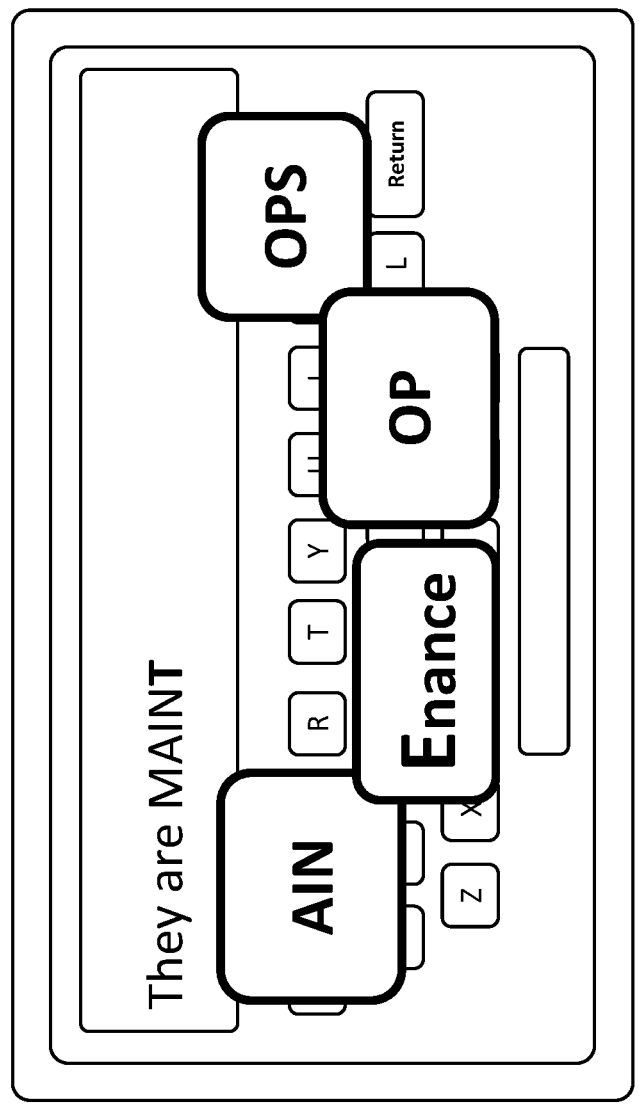

FIG. 5A shows 5A-D menu keys arranged in typical dual qc arc layout, where the initial letters of each word fragment define the left to right alphabetical ordering; thus "AIN" is shown at far left, followed by "ENANCE", etc.

Figure 5B:
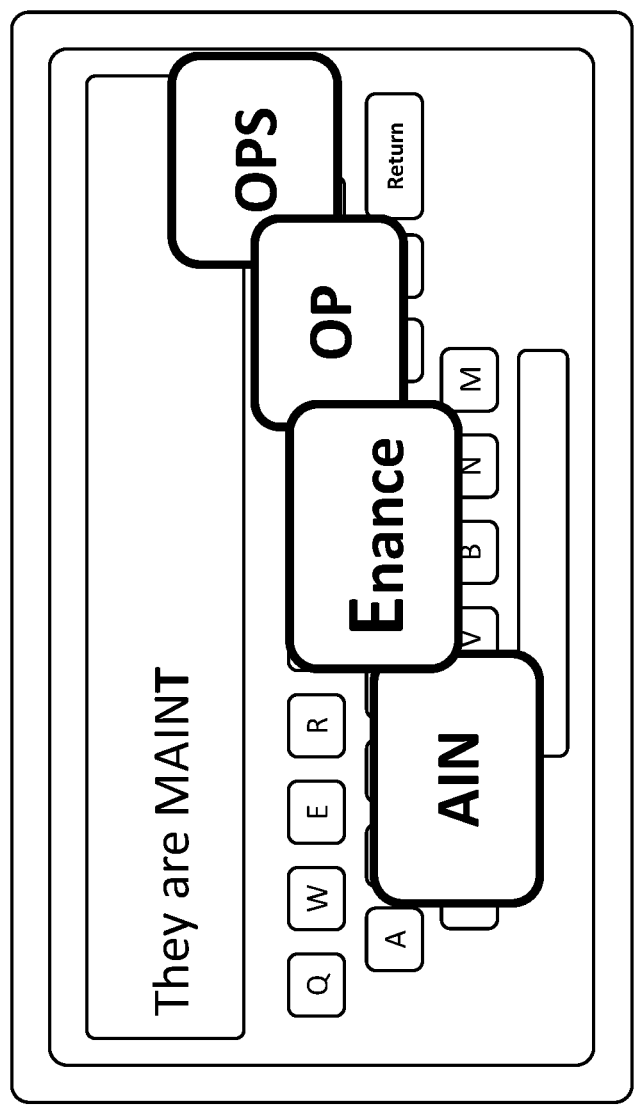

FIG. 5B shows 5A-D menu keys arranged in typical single qc arc layout, in default left to right alphabetical ordering.

Figure 5C:
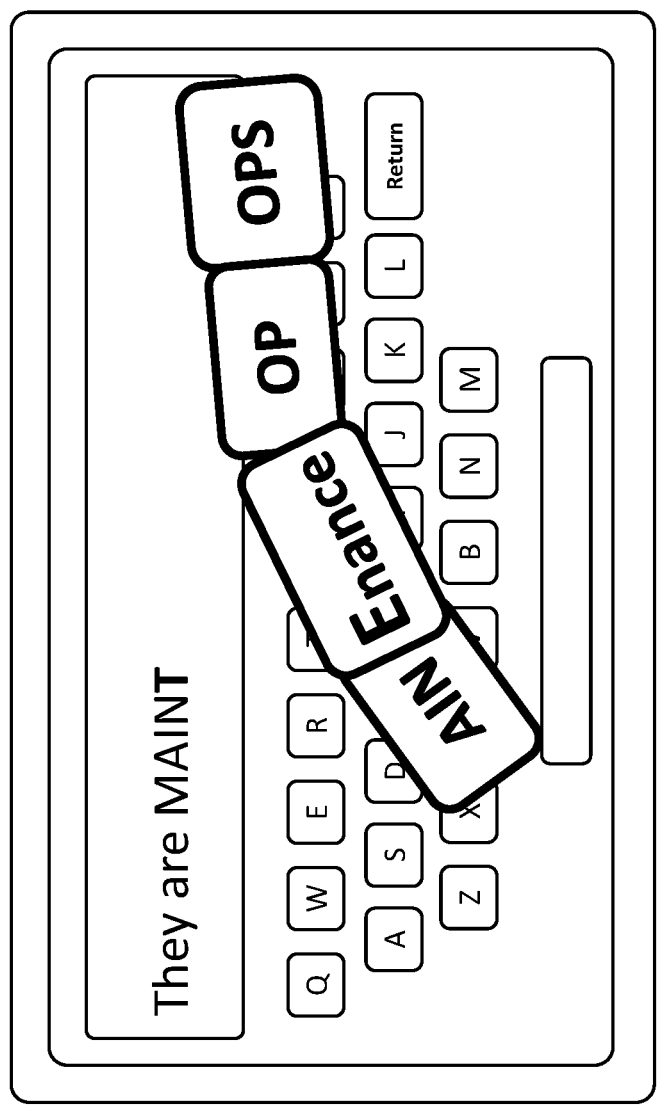

FIG. 5C shows 5A-D menu keys arranged in typical single qc arc layout with keys rotated to more closely mirror the arc curvature.

Figure 5D:
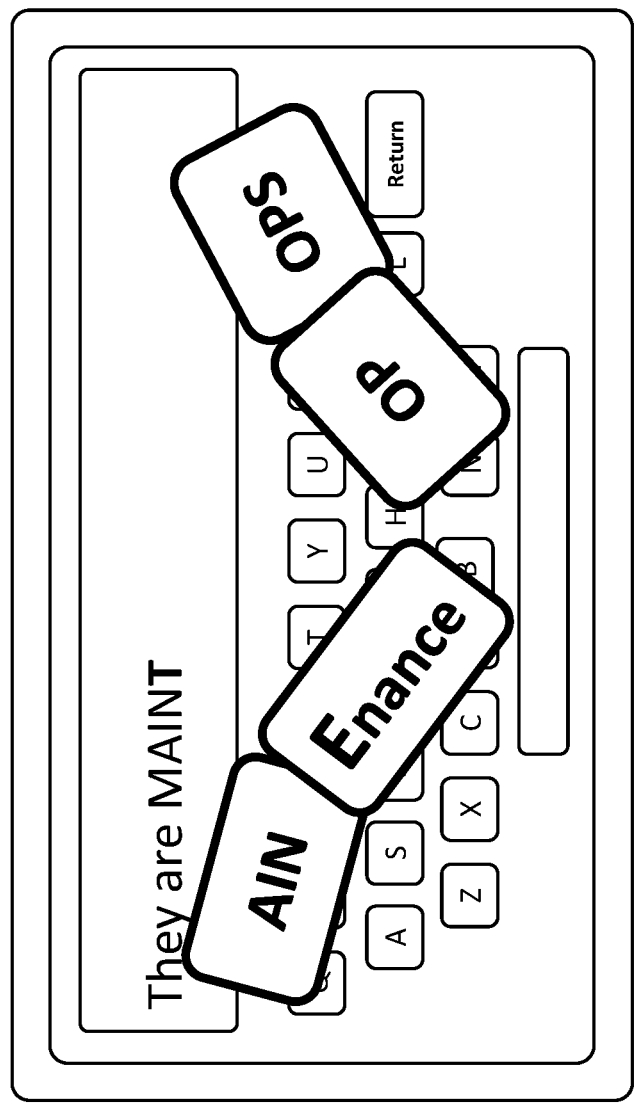

FIG. 5D shows 5A-D menu keys arranged in typical dual qc arc layout with keys rotated to more closely mirror arc curvatures.

FIGS. 6A, 6B, 6C, 6D illustrate multiple arc layout patterns used in the context of the FIGS. 9A, 9B, 9C word example, showing "AIN" entered following initial letters "MAINT" (creating "MAINTAIN"), producing a next limited key menu set of "ED, ER, ING, S" (6A-D menu keys).

Figure 6A:
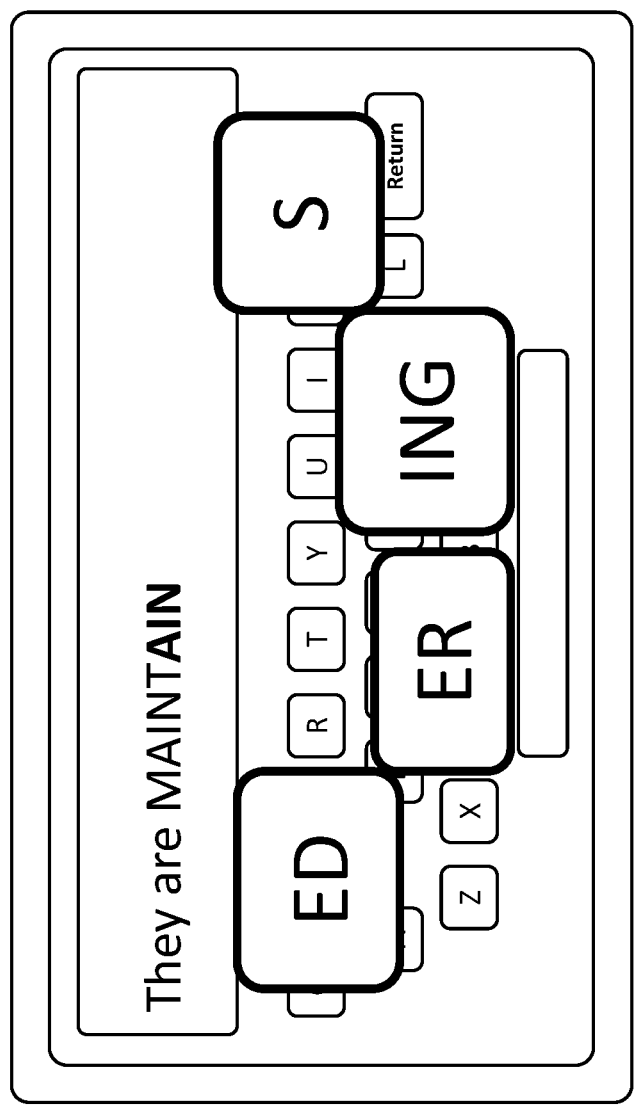

FIG. 6A shows 6A-D menu keys arranged in typical dual qc arc layout.

Figure 6B:
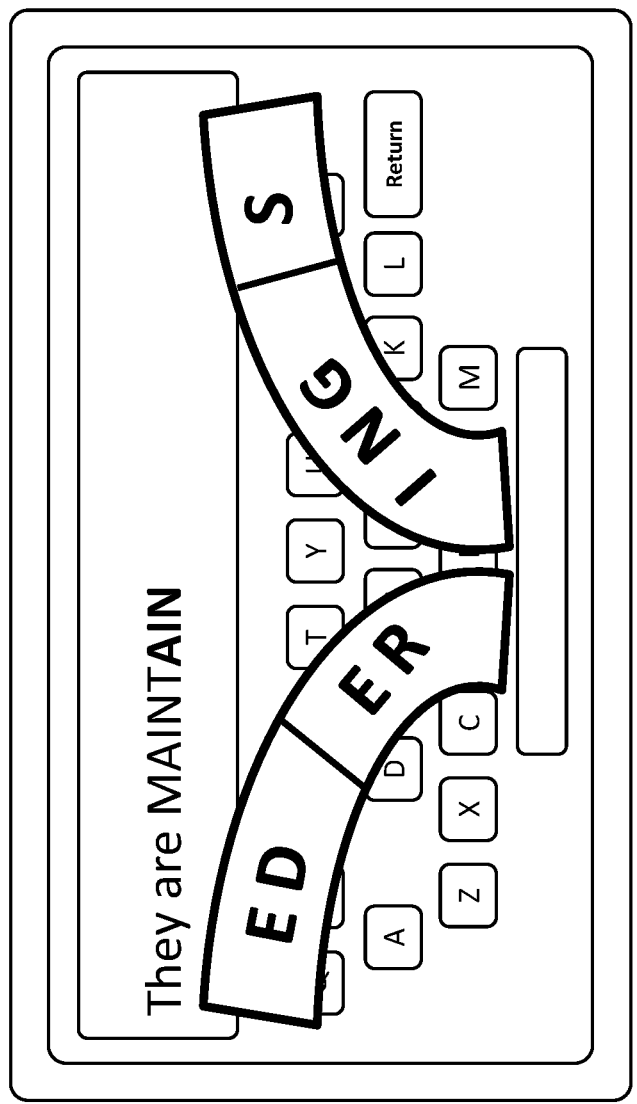

FIG. 6B shows 6A-D menu keys arranged in single right hand qc arc layout with arc slice like key regions, showing the "ING" key with angled letters mirroring arc curvature.

Figure 6C:
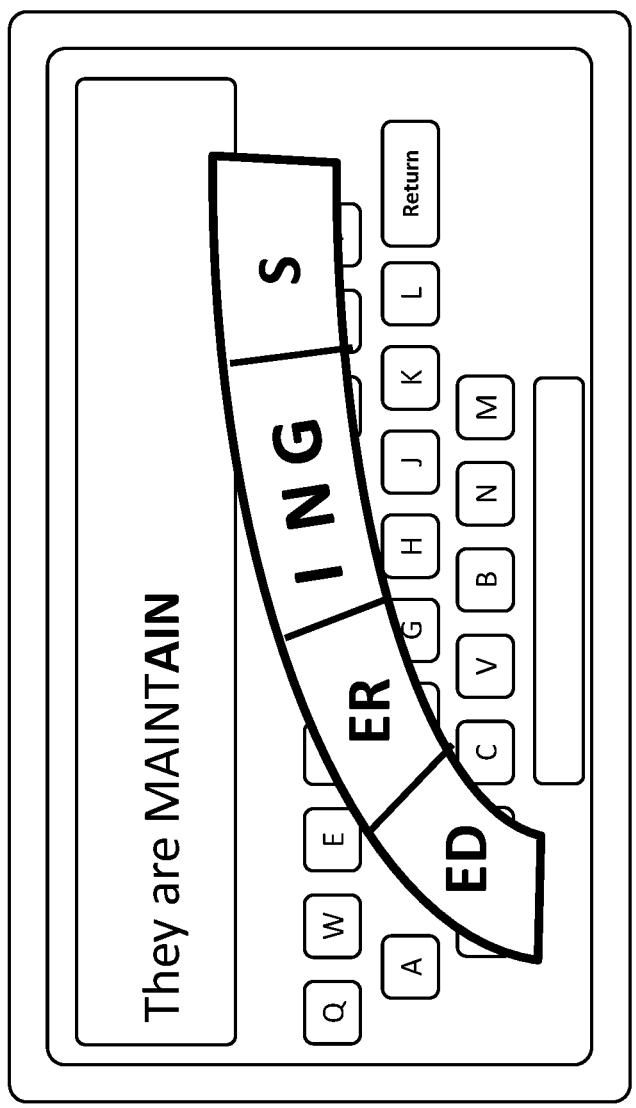

FIG. 6C shows 6A-D menu keys arranged in dual qc arc layout with arc slice like key regions, showing variable letter angle orientations mirroring arc curvature.

Figure 6D:
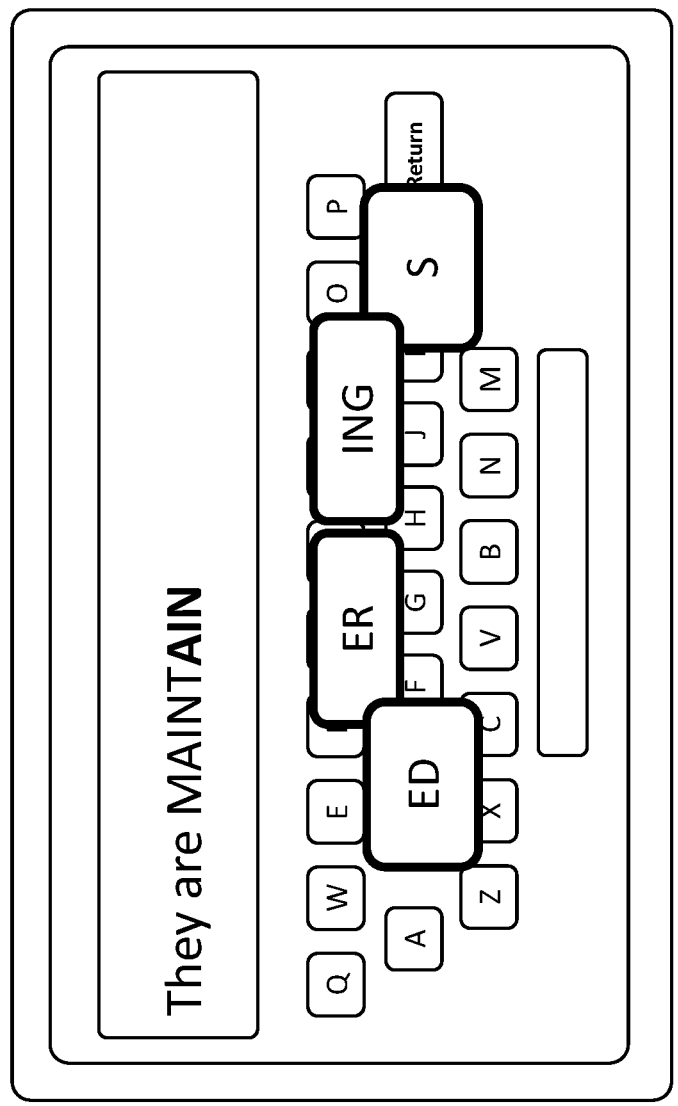

FIG. 6D shows 6A-D menu keys arranged in a typical bottom arc layout. NOTES, REFERENCES AND DEFINITIONS Word, Letter Frequency Research:

Web Resources:
www.norvig.com/mayzner.html
www.wikipedia.org/wiki/Letter frequency
www.wikipedia.org/wild/Project Gutenberg From Wikipedia—Most Common Letters in Common Words:

| | | |
|---|---|---|
| E | 11.1607% | 56.88 |
| A | 8.4966% | 43.31 |
| R | 7.5809% | 38.64 |
| I | 7.5448% | 38.45 |
| O | 7.1635% | 36.51 |
| T | 6.9509% | 35.43 |
| N | 6.6544% | 33.92 |
| S | 5.7351% | 29.23 |
| L | 5.4893% | 27.98 |
| C | 4.5388% | 23.13 |
| U | 3.6308% | 18.51 |
| D | 3.3844% | 17.25 |
| P | 3.1671% | 16.14 |
| M | 3.0129% | 15.36 |
| H | 3.0034% | 15.31 |
| G | 2.4705% | 12.59 |
| B | 2.0720% | 10.56 |
| F | 1.8121% | 9.24 |
| Y | 1.7779% | 9.06 |
| W | 1.2899% | 6.57 |
| K | 1.1016% | 5.61 |
| V | 1.0074% | 5.13 |
| X | 0.2902% | 1.48 |
| Z | 0.2722% | 1.39 |
| J | 0.1965% | 1.00 |
| Q | 0.1962% | (1) |

Official Scrabble Resources: The Merriam-Webster Official Scrabble Players Dictionary (OSPD): www.merriam-webster.com/press-release/scrabble-dictionary-fifth-edition.htm and OSPD online resource tool: www.merriam-webster.com/scrabble.

The invention claimed is:

1. A method for word completion of an intended word during text input by a user on a device, the method comprising:
displaying a virtual keyboard comprising a plurality of keys, wherein each key of the displayed virtual keyboard comprises a selectable region of a screen associated with a sequence of one or more letters;
receiving a user selection of a key on the displayed virtual keyboard;
in response to receiving said user selection, determining an initial word fragment corresponding to the key;
determining a set of possible terminal words beginning with the word fragment;
generating a tree structure, wherein:
a root node represents an initial word fragment,
each leaf node represents a word fragment, and each terminal node represents a final fragment of a possible terminal word and a completed terminal word created by adding each leaf node fragment to its parent nodes;
based on the tree structure, determining the likelihood of a word fragment based on the likelihood of the completed terminal words created using the tree structure associated with said word fragment;
assigning each child word fragment a priority based on the likelihood of said word fragment;
dynamically adjusting an appearance of the displayed virtual keyboard by:
  removing the keys associated with word fragments having the lowest priority;
  modifying the size or shape of each of the remaining keys based on the priority of the word fragment associated with each key and availability of adjacent space;
  modifying the position of each of the remaining keys based on the priority of the word fragment associated with each key wherein the keys associated with the highest priority are presented at the most ergonomically preferred positions on the displayed virtual keyboard,
  wherein the most ergonomically preferred positions are defined as being along the natural arc accessible by the tip of at least one thumb abducting or adducting when at least one thumb is loosely bent at the interphalangeal joint knuckle;
receiving a user selection of one of the keys on the displayed virtual keyboard;
determining the word fragment represented by the selected key;
appending said word fragment to the previously-selected word fragment;
repeating the steps of determining the likelihood of a word fragment, assigning each child word fragment a priority, dynamically adjusting the appearance of the displayed virtual keyboard, receiving a user selection of one of the keys, determining the word fragment, and appending said word fragment, until the intended terminal word is reached.

2. The method of claim 1, keys presented at the most ergonomically preferred positions overlay the virtual keyboard.

3. The method of claim 2, wherein the remaining keys are positioned in ergonomically preferred positions overlaying the virtual keyboard in alphabetical order from left to right.

4. The method of claim 2, wherein the keys presented at the most ergonomically preferred positions overlay the virtual keyboard in a configuration selected from a dual quarter circle, a right hand quarter circle, a left hand quarter circle, and a bottom arc.

5. The method of claim 1, wherein:
prior to receiving the user selection of a key, the plurality of keys of the virtual keyboard are displayed in an initial layout according to the QUERTY or Dvorak standard layout.

6. The method of claim 5, wherein the remaining keys are positioned in ergonomically preferred positions that retain the relative initial layout.

7. A mobile computer device, having a processor, for performing the steps of word completion of an intended word during text input by a user, the steps comprising:
displaying a virtual keyboard comprising a plurality of keys, wherein each key of the displayed virtual keyboard comprises a selectable region of a screen associated with a sequence of one or more letters;
receiving a user selection of a key on the displayed virtual keyboard;
in response to receiving said user selection, determining an initial word fragment corresponding to the key;
determining a set of possible terminal words beginning with the word fragment;
generating a tree structure, wherein:
  a root node re resents an initial word fragment,
  each leaf node re resents a word fragment, and
  each terminal node represents a final fragment of a possible terminal word and a completed terminal word created by adding each leaf node fragment to its parent nodes;
based on the tree structure; determining the likelihood of a word fragment based on the likelihood of the completed terminal words created using the tree structure associated with said word fragment;
assigning each child word fragment a priority based on the likelihood of said word fragment;
dynamically adjusting an appearance of the displayed virtual keyboard by:
  removing the keys associated with word fragments having the lowest priority;
  modifying the size or shape of each of the remaining keys based on the priority of the word fragment associated with each key and availability of adjacent space;
  modifying the position of each of the remaining keys based on the priority of the word fragment associated with each key wherein the keys associated with the highest priority are presented at the most ergonomically preferred positions on the displayed virtual keyboard,
  wherein the most ergonomically preferred positions are defined as being along the natural arc accessible by the tip of at least one thumb abducting or adducting when at least one thumb is loosely bent at the interphalangeal joint knuckle;
receiving a user selection of one of the keys on the displayed virtual keyboard;
determining the word fragment represented by the selected key;
appending said word fragment to the previously-selected word fragment;
repeating the steps of determining the likelihood of a word fragment, assigning each child word fragment a priority, dynamically adjusting the appearance of the displayed virtual keyboard, receiving a user selection of one of the keys, determining the word fragment, and appending said word fragment, until the intended terminal word is reached.

8. The device of claim 7, wherein the keys resented at the most ergonomically preferred positions overlay the virtual keyboard.

9. The device of claim 8, wherein the remaining keys are positioned in ergonomically preferred positions overlaying the virtual keyboard in alphabetical order from left to right.

10. The device of claim 8, wherein the keys presented at the most ergonomically preferred positions overlay the virtual keyboard in a configuration selected from a dual quarter circle, a right hand quarter circle, a left hand quarter circle, and a bottom arc.

11. The device of claim 7, wherein prior to receiving the user selection of a key, the plurality of keys of the virtual keyboard are displayed in an initial layout according to the QUERTY or Dvorak standard layout.

12. The device of claim 11, wherein the remaining keys are positioned in ergonomically preferred positions that retain the relative initial layout.

* * * * *